(12) United States Patent
Hayward

(10) Patent No.: US 10,649,872 B1
(45) Date of Patent: May 12, 2020

(54) DYNAMIC CUSTOMIZED INTEGRATED COMPUTING SYSTEM CONFIGURATION SYSTEM AND METHOD

(71) Applicant: VCE Company, LLC, Richardson, TX (US)

(72) Inventor: Jeffery J. Hayward, Lucas, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 577 days.

(21) Appl. No.: 14/986,297

(22) Filed: Dec. 31, 2015

(51) Int. Cl.
*G06F 11/30* (2006.01)
*G06F 11/32* (2006.01)
*G06F 9/4401* (2018.01)

(52) U.S. Cl.
CPC .......... *G06F 11/327* (2013.01); *G06F 9/4411* (2013.01); *G06F 11/3051* (2013.01)

(58) Field of Classification Search
CPC ... G06F 11/327; G06F 9/4411; G06F 11/3051
See application file for complete search history.

(56) References Cited

U.S. PATENT DOCUMENTS

| | | | | |
|---|---|---|---|---|
| 5,664,180 | A * | 9/1997 | Halpert | G06F 17/50 |
| 8,196,106 | B2 * | 6/2012 | Chow | G06F 17/5022 714/25 |
| 9,891,984 | B1 | 2/2018 | Hayward | |
| 2003/0177412 | A1 | 9/2003 | Todd | |
| 2005/0193353 | A1 | 9/2005 | Malekkhosravi et al. | |
| 2014/0282361 | A1 * | 9/2014 | Beardslee | G06F 8/20 717/104 |
| 2015/0082280 | A1 * | 3/2015 | Betak | G06F 11/3692 717/124 |
| 2016/0139915 | A1 * | 5/2016 | Dimitrakos | G06F 8/61 717/126 |

* cited by examiner

*Primary Examiner* — Viva Miller
(74) *Attorney, Agent, or Firm* — Polsinelli PC

(57) ABSTRACT

An integrated computing system configuration system includes a computing system that executes an application to receive a customized integrated computing system configuration including a plurality of user selected design elements (DEs) associated with multiple components of a customized integrated computing system in which at least one user selected DE has one or more behaviors of the component used in a customized integrated computing system represented by the customized integrated computing system configuration. The application also, for the at least one user selected DE, determines whether one or more other DEs in the customized integrated computing system configuration meet a specified criteria associated with one personality of the at least one user selected DE, determine that the customized integrated computing system configuration is an invalid integrated computing system configuration when at least one of the one or more other DEs do not meet the specified criteria; and generates a report indicating one or more results of the determination.

20 Claims, 20 Drawing Sheets

DYNAMIC CUSTOMIZED INTEGRATED COMPUTING SYSTEM CONFIGURATION SYSTEM AND METHOD

TECHNICAL FIELD

Aspects of the present disclosure relate to computing devices and, in particular, to a dynamic customized integrated computing system configuration system and method.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, integrated computing systems, such as converged infrastructures, were introduced that provide a standardized package of components combined into a single, optimized computing solution. Nevertheless, because the resource needs of each user is often unique, customization of these integrated computing systems remains an area for advancement.

SUMMARY

According to one aspect of the present disclosure, an integrated computing system configuration system includes a computing system that executes an application to receive a customized integrated computing system configuration including a plurality of user selected design elements (DEs) associated with multiple components of a customized integrated computing system in which at least one user selected DE has one or more behaviors of the component used in a customized integrated computing system represented by the customized integrated computing system configuration. The application also, for the at least one user selected DE, determines whether one or more other DEs in the customized integrated computing system configuration meet a specified criteria associated with one personality of the at least one user selected DE, determine that the customized integrated computing system configuration is an invalid integrated computing system configuration when at least one of the one or more other DEs do not meet the specified criteria; and generates a report indicating one or more results of the determination.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1A:
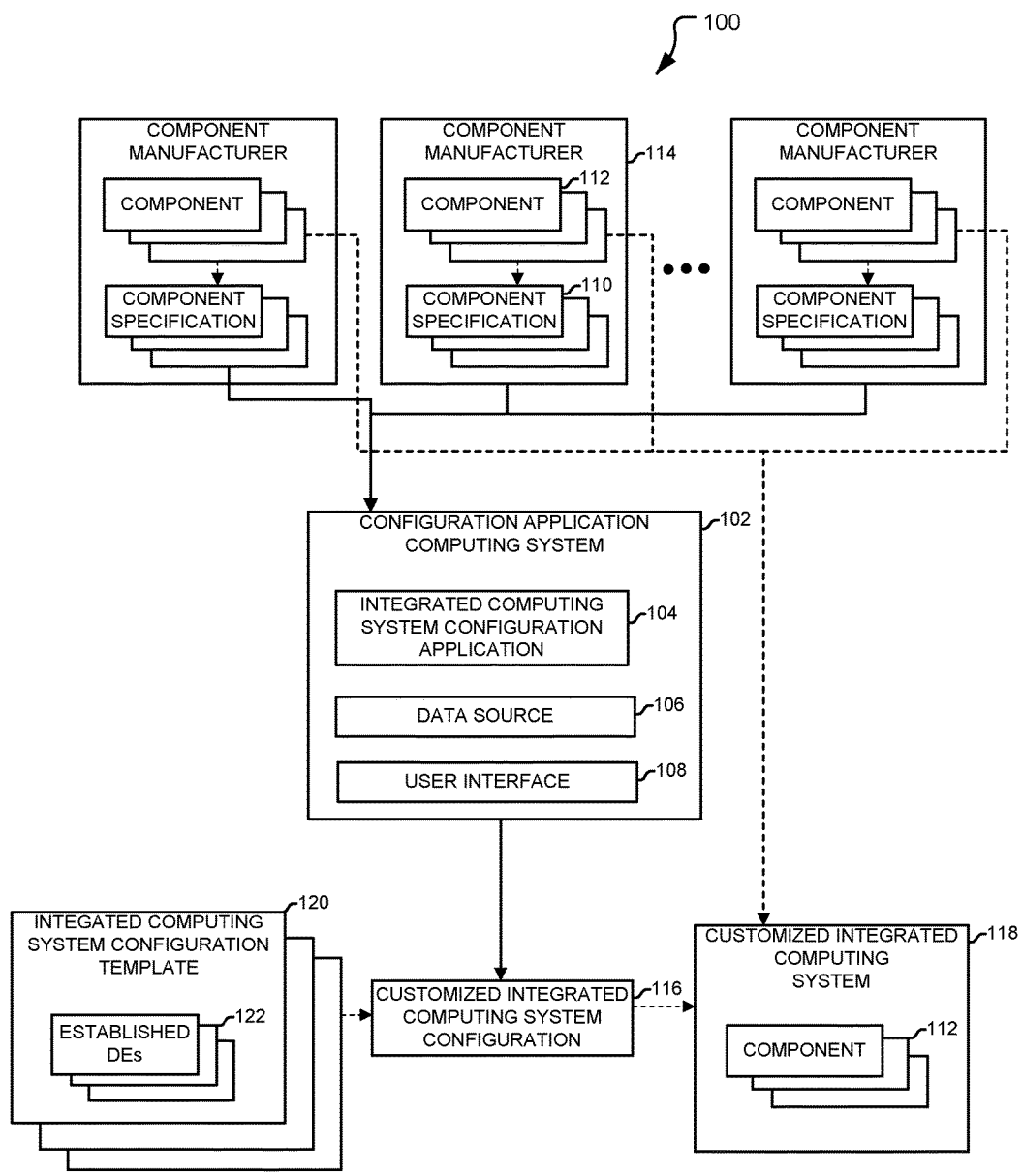
FIGS. 1A and 1B illustrate an example integrated computing system configuration system and associated data source according to one embodiment of the present disclosure.

Embodiments of the present disclosure provide an integrated computing system configuration system and method that provides for unique configuration of integrated computing systems using techniques that enable customization of the integrated computing system while ensuring compatibility of all constituent components with one another in a seamless, easy-to-use manner. The system provides a user-driven model which allows users to pre-select certain components for inclusion in the integrated computing system, and validate the user-selected components against one or more standardized integrated computing system templates to identify a valid integrated computing system configuration. In cases where several alternative components may be required to form a valid integrated computing system configuration, the system provides for user selection of additional, different, and/or fewer components such that the resulting customized integrated computing system configuration may be optimally suited to the user's needs while maintaining compatibility from among the multiple constituent components to be configured in the integrated computing system configuration.

Integrated computing systems typically include multiple individual computing components that have been integrated into a completed (e.g., turn-key) product that functions in a collaborative manner to perform one or more distributed services. For example, a typical integrated computing system may include compute resources for execution of application, storage resources for persistent storage of information processed by the compute resources, and network resources for communicatively coupling certain groups of compute resources with certain other storage resources to perform execution of the applications in a structured and cost-efficient manner. In many cases, it has been advantageous from a business perspective to utilize components from multiple different vendors based upon various factors that may include, for example, feature sets provided by various product offerings from certain vendors, and competitive prices at which these feature sets are provided. For example, a typical integrated computing system may be implemented with a sub-system having compute resources provided by one manufacturer (e.g., Dell™), another sub-system having network resources provided by another manufacturer (e.g., Cisco™), and yet another sub-system having storage resources provided by yet another manufacturer (e.g., EMC Corporation™) that utilize their competitive features in a synergistic manner to provide an optimal configuration for the integrated computing system.

Traditionally, integrated computing systems have typically been implemented using a cost-plus business model in which the components of the integrated computing system are initially selected by the customer and then the costs of their integration are negotiated with a supplier of the integrated computing system. Nevertheless, the trend in the industry recently has been to provide a business model in which one or more base integrated computing system models are proposed to a customer from which one of the proposed models may be selected and customized. Thereafter, one or more customer price quotes (CPQs) may be received from the customer that includes a set of specifications detailing certain performance characteristics to be provided by a customized integrated computing system based on of the proposed models. In general, the CPQ may not necessarily specify specific types of vendor equipment to be implemented, but rather provides certain performance characteristics that can be used to select from among multiple products provided by various vendors. A business model such as this may provide for enhanced customization according to the customer's needs while enabling the implementation of components having the greatest capacity to meet those needs at competitive costs.

Nevertheless, conventional techniques used for integrating multiple resources into an optimal integrated computing system configuration have heretofore remained a challenging endeavor. For instance, these conventional techniques typically incur frequent ongoing changes to the manufacturer's product line such that resources selected during initial negotiation with the customer may no longer be available when the integrated computing system is assembled for final delivery to the customer. For example, it has been estimated that current trends in technological development of computing resources often change at the rate of approximately 1.3 changes-per-day. That is, the cumulative amount of changes that occur to components that are typically integrated into customized integrated computing systems can exceed 1.3 changes per day. For example, a processor manufacturer (e.g., Intel Corporation™) that manufactures processors for use in many computer-based components, often introduces a new architecture approximately every 6 months. Since processors, such as these, often form the basis for the design of many components used in an integrated computing system, the components implemented in these processors may evolve on an ongoing basis to utilize the enhanced technology provided by each successive introduction of new processor architecture. Thus, the myriad of components available for integration into an integrated computing system often changes on a frequent, ongoing basis, thus making their integration difficult to achieve in a timely manner.

This problem is exacerbated by the fact that integration of multiple differing components of an integrated computing system may encounter many dependencies that yields a relatively deterministic set of rules that are hierarchically structured. One example dependency may include a maximum number of compute blades from a certain model of compute sub-system that can be paired with a certain type of storage array. Another example dependency may include a minimum network switch size to be used with a certain type of compute sub-system. When taking into account the myriad of differing types of components to be integrated, the number of dependencies can become overwhelming. For example, a typical mid-range integrated computing system may encounter over 1,000 separate dependencies that should be resolved in order to form a valid integrated computing system configuration. This problem may be worsened by the fact that an initial proposed configuration may not be able to resolve all dependencies thus requiring that the integration process be re-started with a new initial configuration, which can be iteratively time consuming thus inefficiently using the scarce resources of an organization.

Figure 1B:
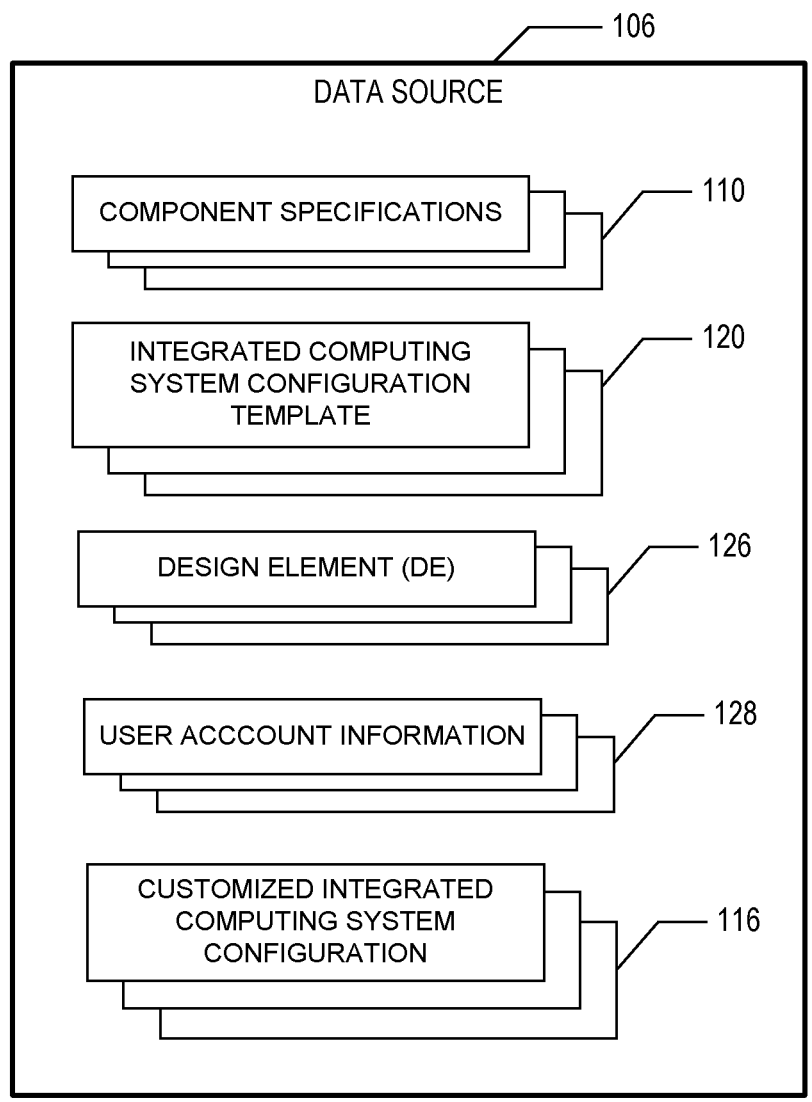

FIGS. 1A and 1B illustrate an example integrated computing system configuration system 100 according to the teachings of the present disclosure. The integrated computing system configuration system 100 addresses the problems discussed above with conventional systems among other benefits and solutions. The system 100 includes a configuration application computing system 102 having an integrated computing system configuration application 104, a data source 106, and a user interface 108. As will be described in detail below, the integrated computing system application 104 receives component specifications 110 associated with components 112 provided by multiple component manufacturers 114, and interacts with a user, via the user interface 108, to receive selection of one or more user selected components to generate a customized integrated computing system configuration 116 representing a customized integrated computing system 118 having a combined set of the components 112 that provide a valid integrated computing system configuration.

The components 112 may include any type that can be integrated into a customized integrated computing system 118. The components 112 may include, for example, data processing devices, data storage devices, servers, networking equipment, environmental control systems, and/or power management systems. In one embodiment, the components 112 may include any type of hardware that provides physical resources that support virtual objects, such as virtual machines, virtual switches, and/or virtual storage objects. These virtual objects may also include logical configuration constructs, such as storage partitions, port groups, virtual private clouds, virtual local area networks (LANs), and private virtual data centers (PVDCs).

In one aspect, the customized integrated computing system 118 includes a combination of these devices that are packaged and interconnected in a standardized manner for ease of maintenance and use. Computing infrastructures (CIs) such as these are often implemented in environments where relatively high reliability and/or availability are desired, such as in an enterprise environment. In one embodiment, the customized integrated computing system 118 includes a CI, such as one of multiple CIs provided by Virtual Computing Environment (VCE) Corporation in Richardson, Tex. Nevertheless, it is contemplated that any computing infrastructure, such as a computer cluster, computing grid, blade array, and/or other computing infrastructure may be configured using the teachings of the present disclosure.

The components 112 used for implementing the customized integrated computing system 118 are selected from among multiple components 112 provided by their component manufacturers 114. The components 112 may include individual components, such as stand-alone computing devices (e.g., a personal computer, such as a laptop or notebook computer, a workstation, or other processing device such as a tablet computer), or a structured combination of computing devices, such as sub-systems involving multiple computing devices, such as a blade array comprising multiple computing devices, a storage array network (SAN) having multiple hard disks, a network switch array having multiple independent switches (e.g., routers), and the like that are each housed in an enclosure and controlled by at least one control system, such as a dedicated computing system configured in the housing. For example, the components 112 may include multiple blades of a blade array provided by one component manufacturer 114 (e.g., Dell™), multiple network switches provided by another component manufacturer 114 (e.g., Cisco™), and/or multiple storage devices configured in a storage sub-system provided by yet another component manufacturer 114 (e.g., EMC Corporation™).

In general, the integrated computing system configuration application 104 receives component specifications 110 associated with the components 112 provided by each component manufacturer 114 to generate design elements (DEs) 126 that are to be used in generating the customized integrated computing system configuration 116. The DEs 126 generally include abstracted representations of their component specification counterparts. That is, the DEs 126 may include only functional information associated with the component specifications 110, while its manufacturer specific information (e.g., make, model, part number, etc.) has been removed. Once the DEs 126 have been generated, the application 104 may receive user selection, via the user interface 108, of one or more desired DEs 126, and compare the user selected DEs 126 against established DEs 122 included in each of one or more integrated computing system configuration templates 120 to automatically select an integrated computing system configuration template 120 that adequately provides a valid customized computing system configuration. A valid integrated computing system configuration generally refers to a combined set of components 112 that, when implemented in a customized integrated computing system, have been validated to be interoperable with one another, and that the components collectively function at one or more performance levels desired by the user of the customized integrated computing system.

The integrated computing system configuration template 120 generally refers to one of multiple standardized integrated computing system product configurations that may be provided by an integrated computing system provider. For example, an integrated computing system provider may offer multiple standardized integrated computing system product configurations (e.g., models) in which each standardized integrated computing system product configuration is optimized for providing certain services based upon its costs. Whereas one standardized integrated computing system product configuration may be optimized for its networking throughput, another standardized integrated computing system product configuration may be optimized for its compute capabilities, while yet another standardized integrated computing system product configuration may be optimized for its storage capabilities. The integrated computing system configuration application 104 provides for selection of a particular integrated computing system configuration template 120 from among multiple integrated computing system configuration templates 120, and configures the selected integrated computing system configuration template 120 to add additional components 112, remove certain components 112, or replace certain components 112 such that a customized integrated computing system configuration may be implemented that is optimally customized according to the user's needs.

Embodiments of the integrated computing system configuration application 104 may provide certain advantages over conventional integrated computing system configuration systems in that it provides enhanced freedom, by the user, over selection of certain types of components to be included in the customized integrated computing system configuration 116. For example, a user, who may be fond of one or several components (e.g., a particular brand and model of storage sub-system, a specified amount of storage capacity, etc.), may input information associated with those components to identify which integrated computing system configuration templates 120 could provide a valid integrated computing system configuration with those user selected components. Because the system 100 abstracts component specifications 110 according to their functionality, a valid integrated computing system configuration may be identified in a relatively short timeframe. The reduced time may also yield other additional advantages. For example, because technological development of the components used in the customized integrated computing system changes rapidly (e.g., approximately 1.3 changes-per-day), implementations of new customized integrated computing system configurations are not affected to the degree to which those implemented by conventional integrated computing system configuration systems would be. That is, the reduced time required to develop customized integrated computing system configurations reduces or eliminates the exposure of the integrated computing system configuration application 104 due to ongoing enhancements in the components to be implemented in the customized integrated computing system configuration 116.

The data source 106 stores component specifications 110, integrated computing system configuration templates 120, DEs 126, user account information 128, and customized integrated computing system configurations 116 that have been generated for users of the system 100. The component specifications 110 generally include information associated with their respective components 112, which are usually provided by the component manufacturer 114. The integrated computing system configuration templates 120 store information about various standardized models that may be customized by an integrated computing system provider. The user account information 128 is used for storing user account information for each user of the system 100. The customized integrated computing system configurations 116 may include completed customized integrated computing system configurations and/or partially completed customized integrated computing system configurations. The completed customized integrated computing system configurations may be those that form a valid customized integrated computing system configuration 116 from which a customized integrated computing system 118 can be created, while the partially completed customized integrated computing system configurations may be those that are not yet ready for creation of a valid customized integrated computing system 116, but rather are saved for further customization at a later point in time. For example, a partially completed customized integrated computing system configuration 116 may be generated by a user during a first login session and saved for further customization at a future point in time. As another example, the partially completed customized integrated computing system configuration 116 may include one in which only one or a few sub-systems (e.g., compute sub-system, network sub-system, storage sub-system, etc.) has been completed. As will be described in detail below, one or more partially completed customized integrated computing system configurations may be combined to form a completed customized integrated computing system configuration 116 from which a valid integrated computing system may be created.

The component specifications 110 include information associated with each component 112 that may, or may not, be selected for inclusion in a customized integrated computing system configuration 116. For example, the integrated computing system provider that uses the integrated computing system configuration application 104 may obtain component specifications 110 from component manufacturers 114 for each component 112 provided by that component manufacturer, and store the component specifications 110 in the data source 106. Thereafter, when the integrated computing system configuration application 104 is executed, it may access the component specifications 110 to generate DEs 126 associated with those component specifications 110.

The DEs 126 represent components 112 and/or groups of components 112 used to create the customized integrated computing system configurations 116 by the application 104, and generally include abstracted information about their respective components 112. Each DE 126 may represent a single component (e.g., a compute blade, a hard disk drive, a router, etc.), or it may represent a structured group of components (e.g., a compute sub-system, a network sub-system, a storage sub-system, etc.) comprises multiple individual DEs 126. Additionally, a DE 126 may represent a completed customized integrated computing system configuration 116 that may be referred to as a top level DE.

Figure 2A:
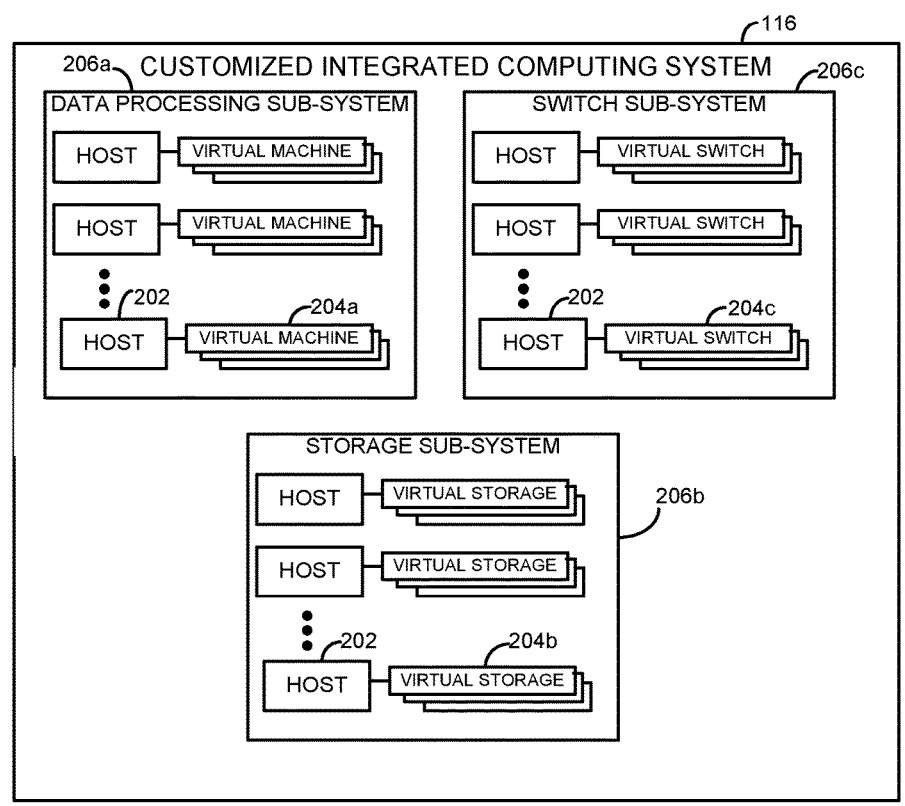
FIGS. 2A and 2B illustrate an example customized integrated computing system that may be configured by the integrated computing system configuration application according to one embodiment of the present disclosure.

FIG. 2A illustrates an example customized integrated computing system 118 that may be configured by the integrated computing system configuration application 104 according to one embodiment of the present disclosure. The particular example customized integrated computing system 118 as shown is a converged infrastructure package that is optimized for data storage utilizing various forms of redundancy for enhanced availability and reliability. For example, a customized integrated computing system 118 such as that shown includes components includes components found in VBLOCK™ infrastructure packages available from Virtual Computing Environment (VCE) Corporation, which is headquartered in Richardson, Tex. Nevertheless, other embodiments of a customized integrated computing system 118 may include additional, fewer, or different components than shown herein without departing from the spirit and scope of the present disclosure.

The customized integrated computing system 118 implemented as a converged infrastructure may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular customized integrated computing system 118 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure.

In one aspect, the customized integrated computing system 118 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure such as that shown includes components found in Vblock™ System infrastructure packages available from VCE, LLC, which is headquartered in Richardson, Tex.

In one aspect, the data storage sub-system 206b includes computer-readable memory structures for storing data used by the customized integrated computing system 118, which may include network attached storage (NAS) arrays and/or storage area network (SAN) arrays that are facilitated by multiple virtual objects (e.g., virtual storage objects 204b). The switch sub-system 206c provides for communication among the various sub-systems of the customized integrated computing system 118, and may include components, such as fabric interconnect systems, Ethernet switches/routers, multilayer director switches (MDSs), and the like. The data processing sub-system 206a executes applications that access, store, and otherwise manipulate data stored by the customized integrated computing system 118. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
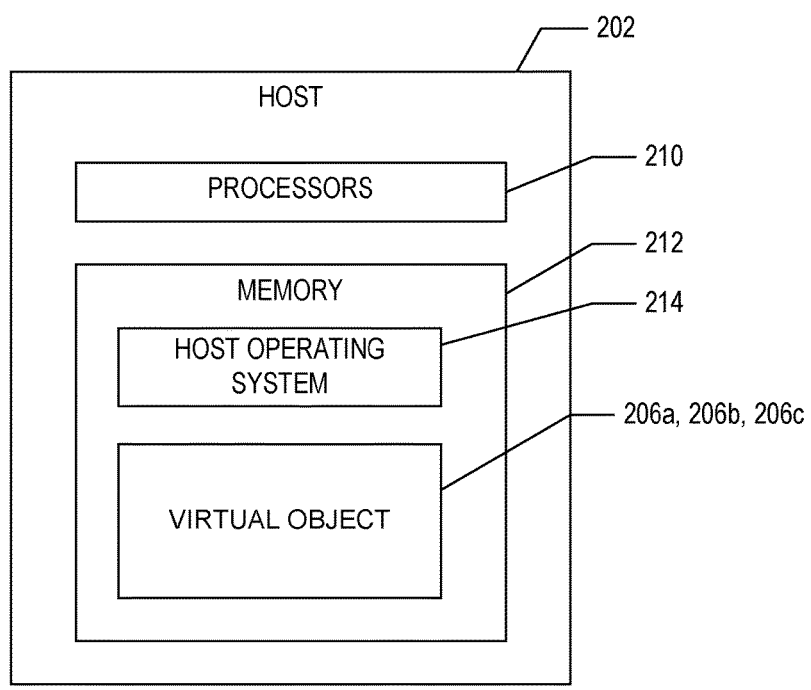

FIG. 2B illustrates an example host 202 implemented on each customized integrated computing system 118 according to one aspect of the application centric compliance management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources of a multi-tier computing environment. Each virtual object may be instantiated or deleted under control of the host operating system 214, which is in turn, controlled by the integrated computing system configuration application 104. That is, the host operating system 214 may be controlled by the integrated computing system configuration application 104 to instantiate new virtual objects are they are needed and destroyed to alleviate excess capacity in their associated hosts 202.

Although the customized integrated computing system 118 described above discloses one particular type of integrated computing system that may be configured by the integrated computing system configuration application 104, it should be understood that the integrated computing system configuration application 104 may be used to configure any computing environment that includes multiple components 112 (e.g., computing clusters, computing grids, blade arrays, etc.) may be viable alternatives.

Figure 3:
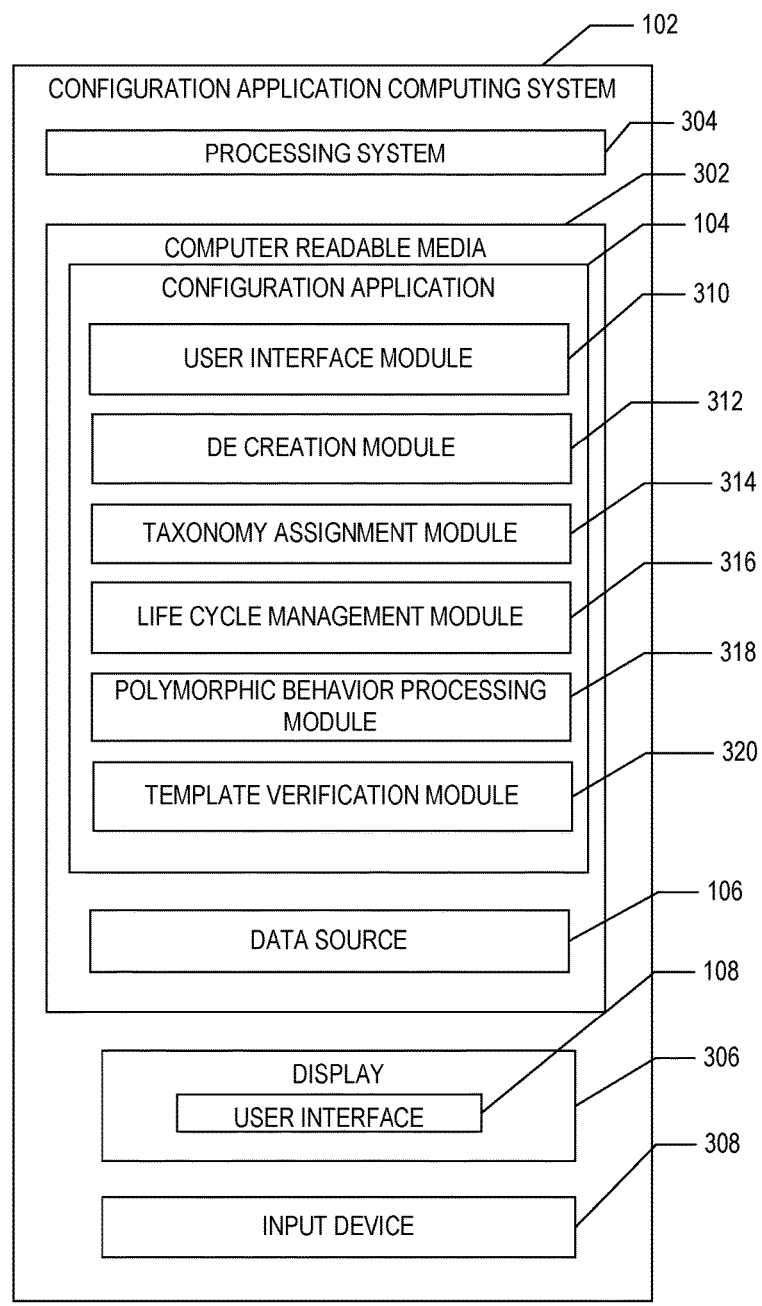
FIG. 3 is a block diagram depicting an example integrated computing system configuration application executed on the configuration application computing system according to one embodiment of the present disclosure.

Referring now in more detail to FIG. 3, a block diagram of an example integrated computing system configuration application 104 executed on the configuration application computing system 102, is depicted according to one aspect of the present disclosure. The integrated computing system configuration application 104 is stored in a computer readable media 302 (e.g., memory) and is executed on a processing system 304 of the configuration application computing system 102. For example, the integrated computing system configuration application 104 may include instructions that may be executed in an operating system environment, such as a Microsoft Windows™ operating system, a Linux operating system, or a UNIX operating system environment.

The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the configuration application computing system 102 also includes a user interface (e.g., a command line interface (CLI), a graphical user interface (GUI), etc.) 108 displayed on a display 306, such as a computer monitor, for displaying data. The configuration application computing system 102 also includes an input device 308, such as a keyboard or a pointing device (e.g., a mouse, trackball, pen, or touch screen) to enter data into or interact with the user interface 108. According to one aspect, the integrated computing system configuration application 104 includes instructions or modules that are executable by the processing system 302 as will be described in detail herein below.

A user interface module 310 facilitates the receipt of input data and/or output data from or to a user, respectively. In one example, the user interface 108 may communicate with other modules in the integrated computing system configuration application 104 to receive user input for manipulating or otherwise modifying the operation of the integrated computing system configuration application 104. As another example, the user interface 108 may receive user input for modifying and/or reviewing the customized integrated computing system configuration 116 on the display 306.

A DE creation module 312 communicates with the user to create a DE from one or more component specifications 110. The DE creation module 312 uses an abstraction technique that reduces the amount of information by removing unique information not necessarily related to the component's operation. By using functionality information associated with each component rather than by using their unique identity (e.g., make, model number, etc.), the number and complexity of system configuration may be reduced. Thus, integrated computing system configurations may be integrated in a shorter time frame than may be provided by conventional integrated computing system configuration systems. Additionally, the shorter time frame may enable the implementation of newly introduced components while avoiding the use of obsoleted or soon to be obsoleted components for implementation in integrated computing systems.

The DE creation module 312 manages the DEs throughout multiple life cycle phases of the components' serviceable life in which the serviceable life is defined as a period in time that the component is available for implementation in a customized integrated computing system. The life cycle phases may be delineated in any desired manner. For example, the life cycle phases managed for each component by the system may include an 'in progress' life cycle phase, an 'in test' life cycle phase, a 'ready for production' phase, and a 'production' life cycle phase. Although the present embodiment describes DEs representing four life cycle phases including a an 'in progress' life cycle phase, an 'in test' life cycle phase, a 'ready for production' phase, and a 'production' life cycle phase, it is contemplated that other embodiments may utilize additional, fewer, or other life cycle phases without departing from the spirit or scope of the present disclosure.

A taxonomy assignment module 314 communicates with the user to create a structured name for each DE 126. The structured name possesses a hierarchal structure in which one or more prefixes having progressively ascending abstracted classifications may be appended to a free-form root name of the structured name. For example, a 10 Tera-byte hard disk drive manufactured by a certain component manufacturer 114 (e.g., ACME Corp.) may be labeled with a root name of '10 TB-ACME' to provide readily accessible cognizance of its identity. The root name may then be prefixed by a hierarchal combination of prefixes of ascending abstraction, such as 'MEMORY|NON-VOLI-TILE|MAGNETIC|', in which the prefix 'MAGNETIC' denotes an abstracted classification of the hard disk drive, the prefix 'NON-VOLATILE' is a further abstracted classification of magnetic storage device, and 'MEMORY' is a yet further abstracted classification of non-volatile memory devices. Such a structure assigned to each DE 126 provides for free-form selection of a readily recognizable nomenclature for the DE while enforcing a level of structure from which DEs representing a myriad of component types may organized in an efficient, structured manner.

A life cycle management module 316 manages DEs 126 throughout the life cycles of their respective components 112. The life cycle phases managed for each component by the life cycle management module 316 include an 'in progress' life cycle phase, an 'in test' life cycle phase, a 'ready for production' phase, and a 'production' life cycle phase, although other types and numbers of life cycle phases may be used. The 'in progress' life cycle phase generally refers to one in which a DE has been generated for a newly sanctioned component and information, such as information provided by the component specification, and/or effective dates of usage, product availability, and the like, are entered into the system. The 'in test' life cycle phase comes after the 'in progress' life cycle phase and generally refers to one in which the component is being tested to ensure conformance to its stated characteristics as defined in the component specifications. The 'ready for production' life cycle phase comes after the 'in test' life cycle phase and refers to one in which testing has been completed and final information, such as component manufacturer contract negotiations, procurement, price contracts, and the like, are being gathered and entered into the 'ready for publish' DE 126. The 'production' life cycle phase comes after the 'ready for publish' life cycle phase and refers to one in which the 'production' DE 126 is available for use by the system 100 for inclusion in a customized integrated computing system configuration 116. Additional details about the various life cycle phases will be described in detail herein below.

The life cycle management module 316 may control the nature and content of changes made to each DE 126 according to the life cycle phase that the DE 126 is currently in. For example, the life cycle management module 316 may only allow modification and/or entry of test data during the 'in test' life cycle phase of a DE 126, and restrict entry and/or modification of a DE 126 while it is in the 'production' life cycle phase. Additionally, the life cycle management module 316 may restrict access to DEs 126 for generating a customized integrated computing system to only those that are in the 'production' life cycle phase. For example, the life cycle management module 316 may restrict access to DEs 126 by the template verification module 320 that are in the 'in process', 'in test', and 'ready for production' life cycle phases.

A polymorphic behavior processing module 318 selects one from among multiple potential personalities to be assigned to a DE 126. A DE 126 may, or may not, have a personality. For example, a rack unit, which is typically used to house components of the customized integrated computing system configuration 116, does not have any characteristic particular to a personality, and thus may not have a personality. However, other components, such as random access storage devices (e.g., dual in-line memory modules (DIMMs)) may be used to provide various capacities in support of a customized integrated computing system 118, and thus may have one of multiple differing personalities based upon what other types of components are used in the customized integrated computing system configuration 116. The personality of a DE 126 generally refers to a type of behavior that a certain structured group of components 112 may be most be most likely to emulate. In other words, the personality of a DE 126 represents a type of behavior that the DE and certain other DEs in the customized integrated computing system configuration are to provide. For example, the polymorphic behavior processing module 318 may detect a personality (e.g., compute intensive integrated computing system, a storage intensive integrated computing system, and/or a network intensive integrated computing system) using the type and quantity of components 112 included in the integrated computing system configuration template 120, and assign a personality to that DE 126 from which a customized integrated computing system configuration 116 may be generated.

A template verification module 320 scans through each integrated computing system template 120 and compares its established DEs 122 against the user selected DEs 126 to determine whether that integrated computing system template 120 has sufficient resources to provide a valid configuration. For example, the template verification module 320 encounters a user selected DE 126 with a personality with a wildcard personality criteria (e.g., multiple potential personality types), it may communicate with the polymorphic behavior processing module 318 to identify a particular personality to be associated with a behavior of a DE 126, and based on the identified personality, scan through the gamut (e.g., corpus) of established DEs 122 in the integrated computing system template 120 to determine whether certain DEs 126 that would function with the subject DE 126 to form a valid configuration. If those DEs 126 do exist, the template verification module 318 labels the integrated computing system template 120 as a valid configuration. Otherwise, if those DEs 126 do not exist, the template verification module 320 labels the integrated computing system template 120 as an invalid configuration.

It should be appreciated that the modules described herein are provided only as examples, and that the application 104 may have different modules, additional modules, or fewer modules than those described herein. For example, one or more modules as described in FIG. 3 may be combined into a single module. As another example, certain modules described herein may be encoded on, and executed on other computing systems, such as on one remotely coupled to the configuration application computing system 102.

Figure 4A:
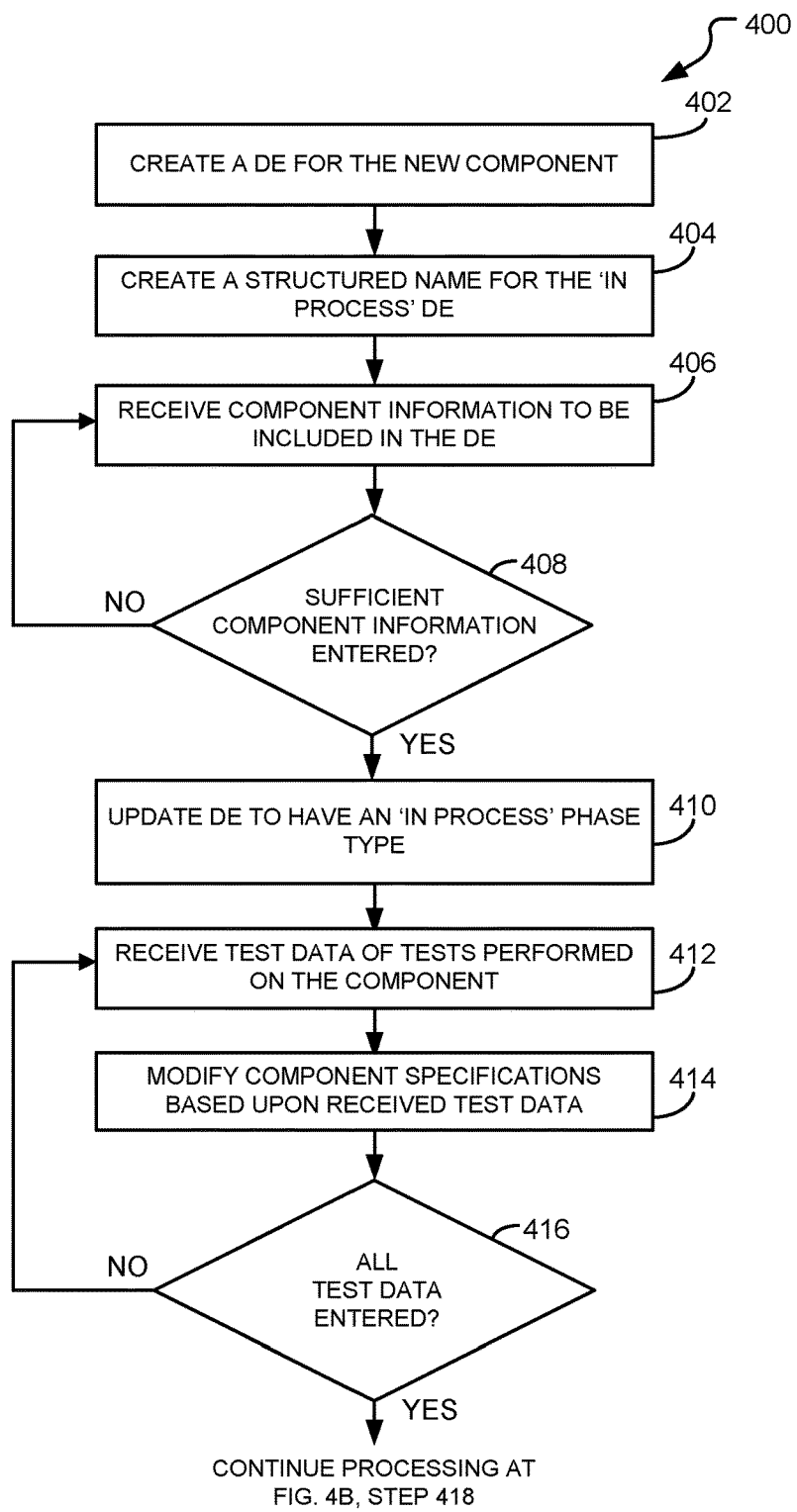
FIGS. 4A and 4B illustrate an example process that may be performed by the application to generate DEs to be used for creating a customized integrated computing system configuration according to one embodiment of the present disclosure.
Figure 4B:
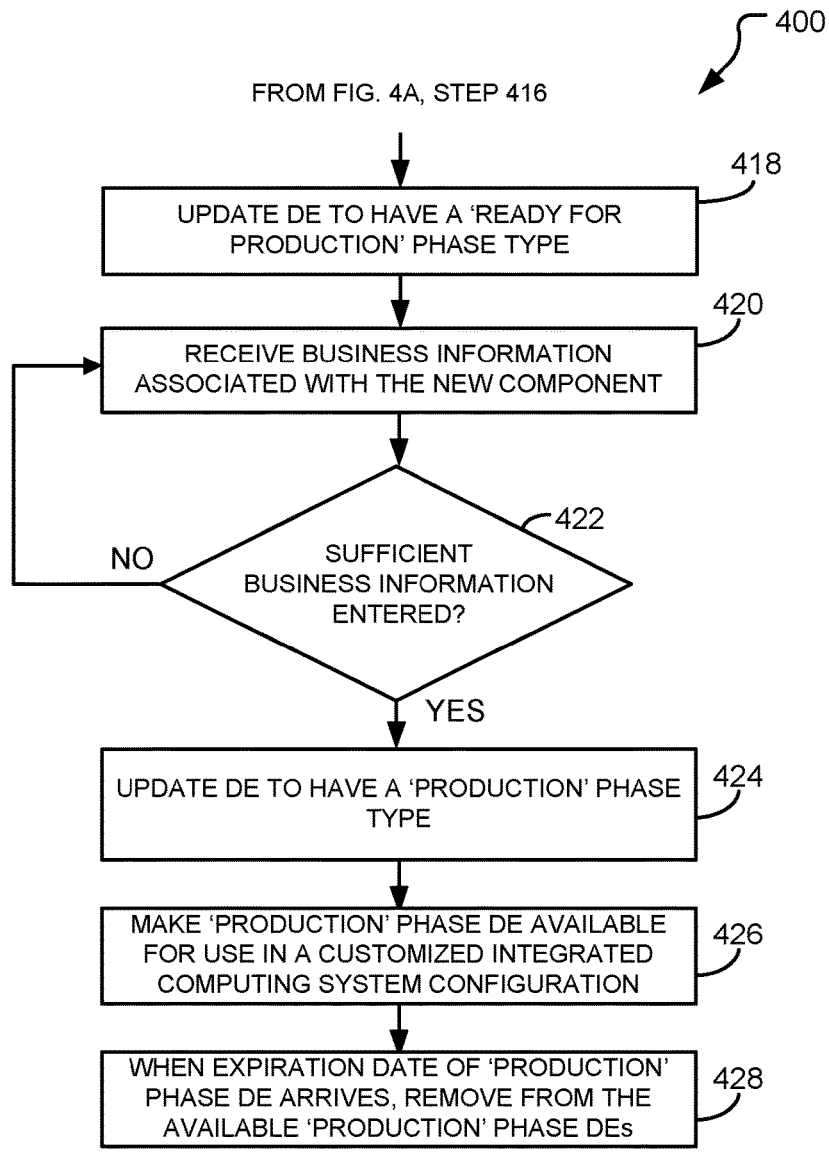

FIGS. 4A and 4B illustrate an example process that may be performed by the application 104 to generate DEs 126 to be used for creating a customized integrated computing system configuration 116 according to one embodiment of the present disclosure. Initially, the user has identified a particular component that is to be sanctioned for use with one or more customized integrated computing system configurations 116. Accordingly, the application 104 interacts with the user, via the user interface 108, to create a DE 126 that is assigned with a life cycle phase of 'in process' for the component 112 in step 402. Thereafter, the application 104 may then communicate with the user, via the user interface 108, to create a structured name for the DE 126 in step 404. In one embodiment, the structured name has an object oriented form with a parent-child relationship in which the structured name includes a root name along with one or more parent classification names appended as a prefix to the root name. Additionally, multiple parent-child relationships may be established for each structured name in which successive prefixes extend from general (e.g., broad) to specific (e.g., narrow). Such a naming structure may be useful for categorizing and searching for appropriate DEs by the system 100 and/or user of the system 100.

Embodiments of the application 104 may provide a relatively large degree of latitude by the user for selecting a name for the newly acquired component. For example, the user may identify a particular classification (e.g., parent) that the new component is to be part of, declare that classification as a parent and select a unique name for that new component. Therefore, the structured name for that DE 126 may have the form '[identified parent classification][user selected name that is unique within that classification]'. To enforce standardized naming conventions, the application 104 may incorporate certain reserved names that are restricted from selection by the user. In many cases, slang terms and/or alternative language may exist for certain types of components. For example, common colloquialisms for hard disk drives may include 'mass storage', 'hard disk', 'magnetic hard disk', and the like. In cases such as this, the application 104 may incorporate reserved names, such as 'mass storage', 'hard disk', 'magnetic hard disk', such that the user is restricted to using a standardized name established for that type of component, which in this particular case, may be a 'hard disk drive.'

In step 406, the application 104 receives component information to be included in the DE 126 during its 'in process' life cycle phase. For example, the application 104 may receive component information from the component specifications 110 stored in the data source 106, and communicate with the user input, via the user interface 108, for changing those component specifications. Alternatively, the application 104 receives the component information directly from the component specifications provided by the component manufacturer 114 of the component 112, and manipulates the component specifications to a format suitable for use by the application 104. When in the 'in process' life cycle phase, the application 104 may restrict modification of the DE 126 to only that information associated with component information. In this manner, the information allowed to be inputted into the DE 126 may be provided with an organized, structured form that may enhance the integrity of how the DE 126 is managed by the application 104 in some embodiments.

In step 408, the application 104 determines whether sufficient component information has been entered while the DE 126 is in the 'in progress' life cycle phase. If so, processing continues at step 410 in which the component 112 enters the 'in test' life cycle phase; otherwise, processing continues at step 406 for entry of additional component information for the 'in progress' DE 126.

When the DE 126 enters the 'in test' life cycle phase, the application 104 may update the DE 126 to have an 'in test' life cycle phase. In one embodiment, the application 104 may generate one or more additional fields for entry of test data associated with one or more tests performed on the new component 112 in step 410. When in the 'in test' life cycle phase, the application 104 may restrict modification of the DE 126 to only that information associated with test information. That is, once the DE 126 enters the 'in test' life cycle phase, additional entry or modification of component information is restricted by the application 104.

In step 412, the application 104 receives test data associated with one or more tests that have been performed on the component 112. For example, if the component 112 is a hard disk drive and its advertised component specifications indicate that it has a 65 nano-second access time, the application 104 may include a field to receive test information about actual access time that may be provided by that hard disk drive. In step 414, the application 104 may modify the component specifications stored in the 'in test' DE 126 according to the received test data. For example, given the hard disk drive specification above that advertised a 65 nano-second access time, this specification may be modified according to actual test data obtained for that hard disk drive.

In step 416, the application 104 determines whether test data entry has been completed. If so, processing continues at step 418 in which the DE 126 enters the 'ready for production' life cycle phase; otherwise, processing continues at step 414 for entry of additional test data for the 'in test' DE 126. When the DE 126 enters the 'ready for production' life cycle phase, the application 104 may update the DE 126 to have a 'ready for production' life cycle phase in step 418. When in the 'ready for production' life cycle phase, the application 104 may restrict modification of the DE 126 to only that information associated with business information. That is, once the DE 126 enters the 'ready for production' life cycle phase, additional entry or modification of component information or test information is restricted by the application 104.

In step 420, the application 104 receives business information to be included in the 'ready to production' DE 126. For example, the application 104 may receive user input, via the user interface 108, for obtaining business information, such as price contracts, procurement windows, price negotiations, and the like, from the user.

In step 422, the application 104 determines whether business data entry has been completed. If so, processing continues at step 424 in which the DE 126 enters the 'production' life cycle phase; otherwise, processing continues at step 420 for entry of additional business information for the 'ready for publish' DE 126.

In step 424, the application 104 updates the DE 126 to be in the 'production' life cycle phase, and makes the 'production' DE 126 available for implementation in a customized integrated computing system configuration 116 in step 426.

When in the 'production' life cycle phase, the application 104 may restrict modification of the DE 126; modifications to the DE 126 are no longer allowed by the application 104. In this manner, the integrity of the information aggregated during the previous life cycle phases may be maintained at a static, consistent level. In some embodiments, when modifications to the DE 126 are needed, the application 104 may update the life cycle tag 502 to assign the DE 126 to the 'in process', 'in test', or 'ready for production' life cycle phase so that appropriate changes may be made, and revert the DE 126 back to the 'production' life cycle phase once the modifications are complete. In another embodiment, the ability to change the life cycle tag 502 may be restricted according to an authorization level (e.g., administrator, group director, project manager, etc.) associated with the user.

When in the 'production' life cycle phase, the application 104 may allow implementation of the DE 126 in a customized integrated computing system configuration 116. Additionally, when in the 'production' life cycle phase, the application 104 may continually monitor the status of the DE 126 to determine whether that DE 126 has expired. Thereafter, when the expiration date associated with that 'production' DE 126 has expired, the application 104 may remove that 'production' DE 126 from among the available 'production' DEs 126 used for inclusion in a customized integrated computing system configuration 116 in step 428.

The previously described process may be repeated for other components 112 implemented for use by the application 104. Nevertheless, when use of the application 104 is no longer needed or desired, the process ends.

Figure 5:
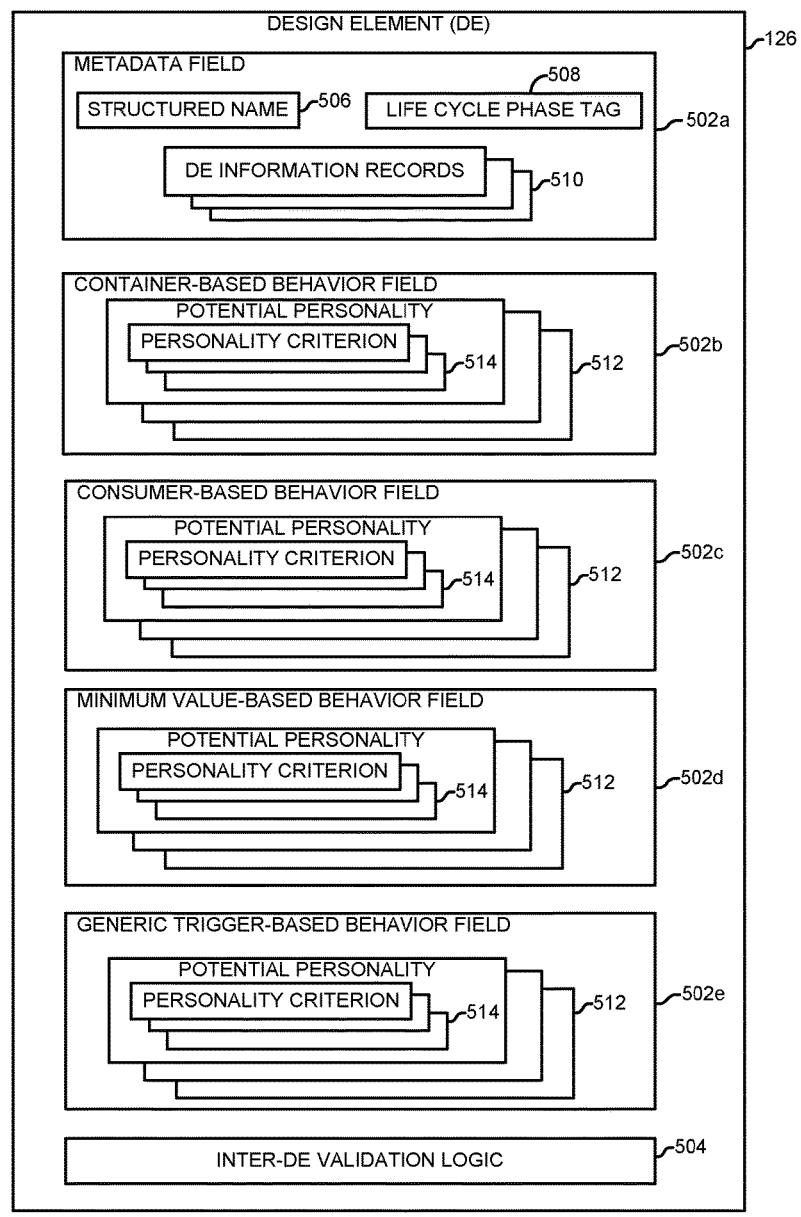
FIG. 5 illustrates an example design element (DE) that may be generated by the system according to one embodiment of the present disclosure.

FIG. 5 illustrates an example DE 126 that may be generated by the system 100 according to one embodiment of the present disclosure. In general, the DE 126 exists as a structured combination of parameters with executable logic that may be stored in a memory (e.g., computer-readable memory 302) and copied/moved from one memory location to another as an integral structure based on the needs of the application 104. Thus, each DE 126 may include sufficient information for validating its arrangement with other DEs in a customized integrated computing system configuration 116 in order to provide a valid configuration.

The DE 126 has one or more fields including a metadata field 502a, a container-based behavior field 502b, a consumer-based behavior field 502c, a minimum value-based behavior field 502d, and a generic trigger-based behavior field 502e. The DE 126 also includes inter-DE validation logic 504 that may be used to verify the behaviors of its respective DE 126 with other DEs in the customized integrated computing system configuration 116.

The metadata field 502a includes various forms of metadata associated with its respective component 112. For example, the metadata field 502a may include a structured name 506 such as one generated for the DE 126 as described above with reference to FIG. 4A, a life cycle phase tag 508 that stores information associated with its life cycle phase (e.g., 'in process', 'in test', 'ready for production, or 'production'), and one or more DE information records 510 including information, such as that information associated with one or more particular integrated computing system configuration templates 120 that the DE 126 may be implemented with, test data, and/or any availability dates (e.g., effective date, expiration date) associated with the DE 126. The life cycle phase tag 508 represents a life cycle phase representing a portion of a life cycle that the component is available for implementation in the customized integrated computing system.

The container-based behavior field 502b, consumer-based behavior field 502c, minimum value-based behavior field 502d, and generic trigger-based behavior field 502e store various potential personalities 512 that may be used by the application 104 to ensure that its respective component 112 provides a valid integrated computing system configuration when included in a customized integrated computing system configuration 116. Each of the container-based behavior field 502b, consumer-based behavior field 502c, minimum value-based behavior field 502d, and generic trigger-based behavior field 502e may include potential personalities or they may be empty if not applicable to its respective DE 126.

The container-based behavior field 502b includes information about whether its respective component 112 serves as a container for another DE 126. In other words, the container-based behavior indicates whether its respective DE is to provide a portion of its allocated capacity for one or more other DEs 126. For example, the container-based behavior field 502b may indicate that its respective component 112 is a rack that houses one or more other components, such as a blade array enclosure, a power distribution unit.

The consumer-based behavior field 502c includes information about whether its respective component 112 serves as a consumer of another component (e.g., a container component). That is, the consumer-based behavior field 502c is complementary to the container-based behavior field 502b in that it indicates whether its respective component 112 is to consume at least a portion of an allocated capacity of another DE 126 (e.g., another DE having a container-based behavior). A DE 126 may include container as well as consumer characteristics. For example, a DE 126 associated with a blade array enclosure may include a consumer characteristic to indicate that it is housed in a rack, and a container characteristic to indicate that it may contain multiple computing blades.

The minimum value-based behavior field 502d includes information about any minimum quantities of that DE 126 or other DEs in the customized integrated computing system configuration 116 that may be required to form a valid customized integrated computing system configuration 116. For example, the minimum value-based behavior field 502d may include a minimum value indicating that, if it has been determined to have a personality of a unified computing system (UCS), then a minimum quantity of 48 DEs 126 representing input/output (I/O) expansion slots should be present in the customized integrated computing system configuration 116. As another example, the minimum value-based behavior field 502d may include a minimum value indicating that, if a certain integrated computing system configuration template 120 is provided, then a minimum of 2 rack component DEs 126 should also be present in the customized integrated computing system configuration 116.

The generic trigger-based behavior field 502e includes information about certain actions to take by the application 104, when that trigger condition is met. For example, a DE 126 representing a rack may include a trigger condition instructing the application 104 to check for the inclusion of at least two power output units (POUs) in the customized integrated computing system configuration 116, and if 2 DEs 126 representing two POUs are not found, assign an invalid configuration to that integrated computing system template 120.

Each of the container-based behavior field 502b, consumer-based behavior field 502c, minimum value-based behavior field 502d, and/or generic trigger-based behavior field 502e may include a potential personality 512. The personality that may be included in each behavior field generally refers to a type of functionality that the DE 126 may possess.

In one embodiment, the potential personality may be stored with a wildcard value (e.g., 'any'). For example, the potential personality 512 with a wildcard value may indicate that the component 112 represented by the DE 126 is adapted to support a unified storage system (UCS), a redundant array of inexpensive disk (RAID) storage system, other type of storage system. In such a case, the application 104 may determine a personality for the DE 126 based upon a quantity and/or arrangement of other DEs in the customized integrated computing system configuration 116 using one or more personality criteria 514. For example, when the application 104 identifies a relatively large quantity of network attached storage components, it may determine that the configuration of the customized integrated computing system configuration 116 is most likely adapted to providing a unified storage system, such as one that can combine locally configured storage mediums (e.g., hard drives, flash drives, etc.) and network attached storage mediums (e.g., network attached storage) using low level system calls that enable seamless operation and/or various redundancy (e.g., redundant array of inexpensive disk (RAID), etc.) schemes.

Although FIG. 5 illustrates one example of a DE 126 representing a component 112 used to form a customized integrated computing system 118, it is contemplated that the DE 126 may have other specific forms without deviating from the spirit and scope of the present disclosure. For example, the DE 126 may have additional, fewer, or different types of behavior fields 502 than what is shown and described herein. Additionally, the metadata field 502 may include additional, fewer, or different types of information than what is shown and described herein with regard to the metadata field 502.

Figure 6A:
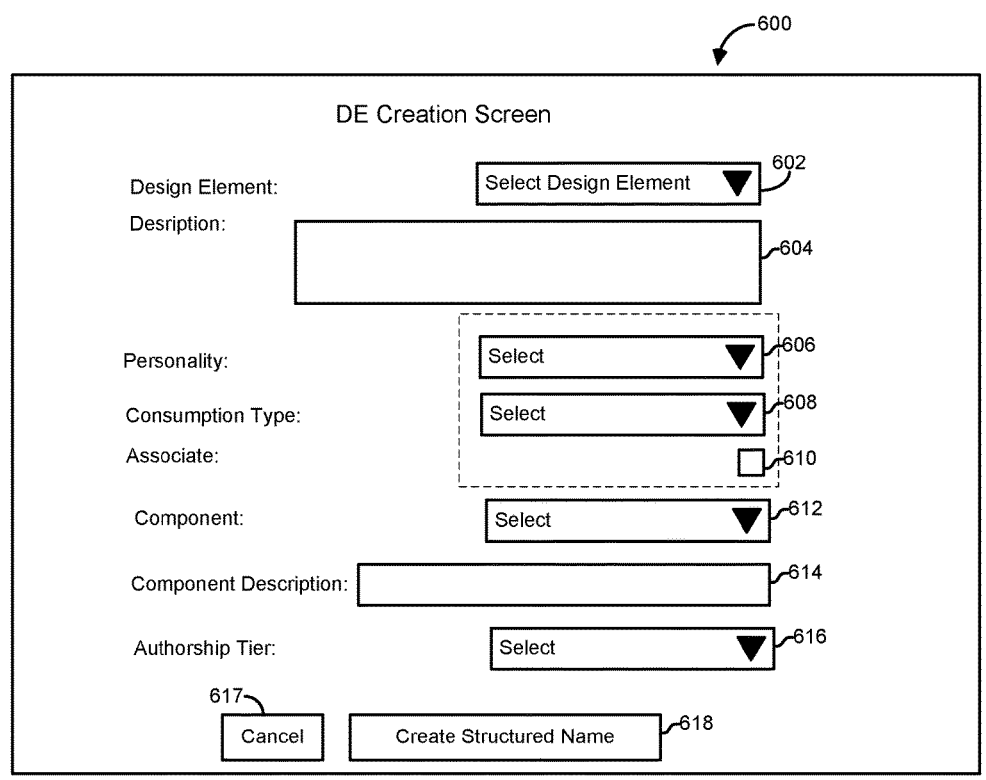
FIGS. 6A and 6B illustrate example screenshots that may be displayed by the application for interacting with the user to receive information for creating a DE representing a component used to form a customized integrated computing system according to one embodiment of the present disclosure.
Figure 6B:
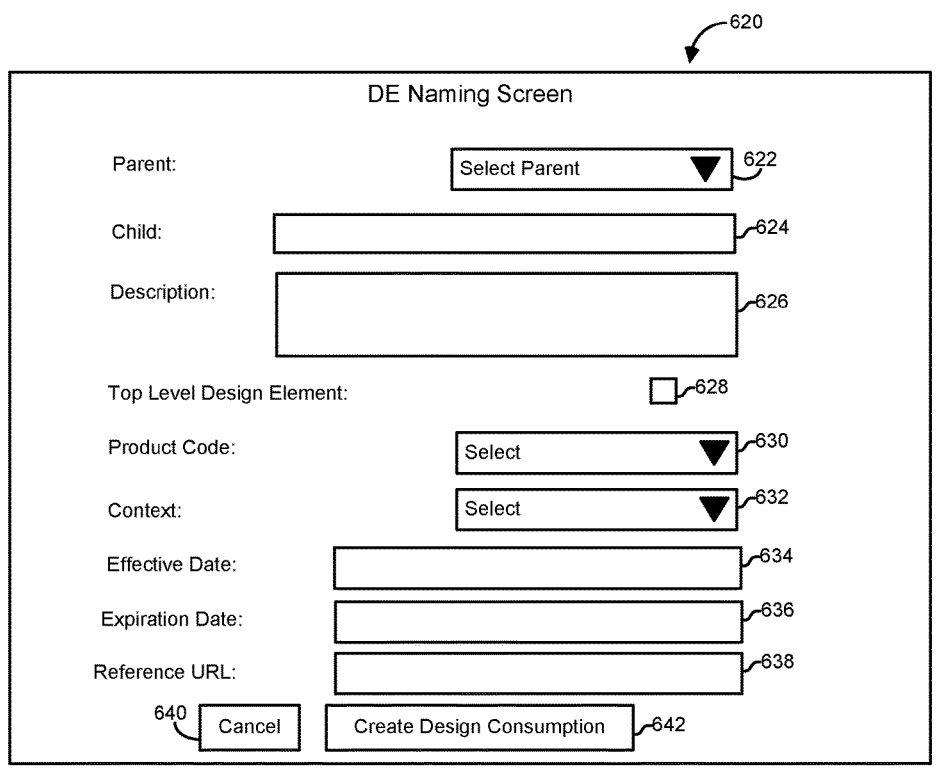

FIGS. 6A and 6B illustrate example screenshots that may be displayed by the application 104 for interacting with the user to receive information for creating a DE 126 representing a component 112 used to form a customized integrated computing system 118 according to one embodiment of the present disclosure. In general, FIG. 6A is a DE creation screen 600 that may be used to receive user input for creating a DE 126, while FIG. 6B is a DE naming screen 620 that may be displayed for receiving user input for generating a structured name for the newly created DE 126.

Referring initially to FIG. 6A, the DE creation screen 600 includes a 'design element' entry field 602, a 'description' field 604, a personality' field 606, a consumption type' field 608, an 'association' field 610, a 'component' field 612, a 'component description' field 614, an 'authorship tier' field 616. The 'design element' entry field 602 may be used to provide a type (e.g., storage device, compute device, network device, etc.) of component represented by the DE 126. The description' entry field 604 may be used to provide a long form description of the component being represented by the DE 126. For example, the 'description' entry field 604 may be populated with free-form text information indicating certain aspects about the component that may be useful to other users, such as "This component associated with this DE is to be used with all new integrated computing system templates developed after a specified date."

The 'personality' field 606 and the 'consumption type' field 608 may be provided to receive user selection of one or more personalities to be applied to each behavior in the newly created DE 126. The 'consumption type' field 608 may be provided to receive selection of one or more behaviors (e.g., a container-based behavior, a consumer-based behavior, a minimum value-based behavior, a generic trigger-based behavior, etc.) of the DE 126 to be associated with the personality entered in the 'personality' field 606. For example, the 'personality' field 606 may be provided to select a particular personality to be associated with a behavior entered in the 'consumption type' field 608. When both the 'personality' field 606 and 'consumption type' field 608 have been entered, the 'associate' tag 610 may be selected to associate the entered personality with the selected 'consumption type' field 608. In this manner, personalities may be entered for none, some, or all behavior types (e.g., container behavior, the consumer behavior, the minimum behavior, and/or generic trigger behavior) in the newly created DE 126.

In one example, the DE 126 may be tagged with one specified personality (e.g., a unified storage system (UCS) personality) to be associated with the generic trigger behavior to indicate that the DE 126 is to be used in a unified storage system environment. For another example, a certain behavior may be tagged with a wildcard value (e.g., 'any') indicating that a certain behavior can have any personality as determined by the application 104. That is, when the application 104 encounters a DE 126 with a behavior having a wildcard personality value, it may search through the other DEs 126 in the customized integrated computing system 116 to assign the behavior of the subject DE 126 with a personality according to the quantity and arrangement of other DEs in the customized integrated computing system configuration 116.

The 'component' field 612 may be provided to receive selection of a type of component represented by the DE 126. The 'component description' field 614 may be provided to receive user supplied free-form text to be associated with the DE 126. For example, the 'component description' field 614 may include textual information about any particular nuances associated with use of the component represented by the DE 126. The 'authorship tier' field 616 may be provided to receive information associated with permissions based control over modification rights to the DE 126. For example, the 'authorship tier' field 616 may be populated with a value of 'A' to indicate that anyone has modification rights to the DE 126, a value of 'B' to indicate that only employees of a certain organization has modification rights to the DE 126, a value of 'C' to indicate that only the development department of the organization has modification rights to the DE 126, a value of 'D' to indicate that only the administrator of the system 100 has modification rights to the DE 126.

The DE entry screen 600 also includes a 'cancel' button 617 that may be selected by the user to exit the DE creation screen 600, and a 'create structured name' button 618. When the application 104 receives user selection of the 'create structured name' button 618, it may display the DE naming screen 620. The DE naming screen 620 includes a 'parent' entry field 622, a 'child' entry field 624, a 'description' entry field 626, a 'top level design element' selection field 628, a 'product code' selection field 630, a 'context' entry field 632, an 'effective date' entry field 634, an 'expiration date' entry field 636, and an optional 'reference uniform resource locator' (URL) entry field 638.

The parent entry field 622 may be provided to receive selection of a suitable parent classification name for the subject DE 126, while the child entry field 624 may be provided to receive user entry of free-form text data for generating a root name for the DE 126. For example, the user may enter a root name of '9100S' to indicate a particular model name provided by the component manufacturer 114 for the component 112. Additionally, the user may select a parent having a hierarchy of classifications beginning with a relatively narrow classification name (e.g., a multilayer director switch (MDS)), which is part of a broader classification of network switches (e.g., a 48 port switch system), which is part of a yet broader classification name (e.g., a storage area network (SAN), which is part of a yet broader classification name (e.g., networking devices). Given this parent classification selected by the user, the application 104 may generate a structured name having the form 'NETWORK_SWITCH|SAN|48_PORTS|MDS|9100S'.

The description' entry field 626 may be used to provide a long form description of the structured name for the DE 126. For example, the description entry field 626 may be populated with information associated with how or why the child entry field 624 was chosen. That is, if a name of 'diskStorageMarch2015' was selection for inclusion in the child entry field 624, the description' entry field 626 may be populated with text information indicating that the component was created in the month of March of year 2015.

The 'top level design element' selection field 628 may be provided to receive selection, by the user, of whether the subject DE 126 is a top level design product (e.g., a completed customized integrated computing system configuration 116 to be used in the creation of a customized integrated computing system). If the 'top level design element' selection field 628 is selected by the user, the 'product code' entry field 630 may be provided to receive user selection of a particular integrated computing system configuration template 120 that the DE 126 may represent. The 'effective date' entry field 634 may provide for user selection of a date at which the component 112 represented by the subject DE 126 is to be made available for inclusion in a customized integrated computing system configuration 116, while the 'expiration date' entry field 636 may provide for user selection of another future date at which the component 112 represented by the subject DE 126 is no longer available for inclusion in a customized integrated computing system configuration 116.

The 'reference URL' entry field 638 may be provided to receive user input of a URL that includes additional specifications, instructions, and/or description associated with the component 112 represented by the subject DE 126. The DE naming screen 620 also includes a 'cancel' button 640 that may be selected by the user to exit the DE naming screen 620, and a 'create DE' button 642 that instructs the application 104 to persist the newly created DE 126 in the memory 302.

Although FIGS. 6A and 6B illustrate example screens that may be used for receiving user input for establishing a DE 126 and generating a structured name for the DE 126, the application 104 may display additional, fewer, or different screens or information included in those screens without departing from the spirit and scope of the present disclosure. For example, the application 104 may display other screens for entry of test data while the component 112 is in the 'in test' life cycle phase, or business information while the component is in the 'ready for production' life cycle phase of the component 112.

Figure 7A:
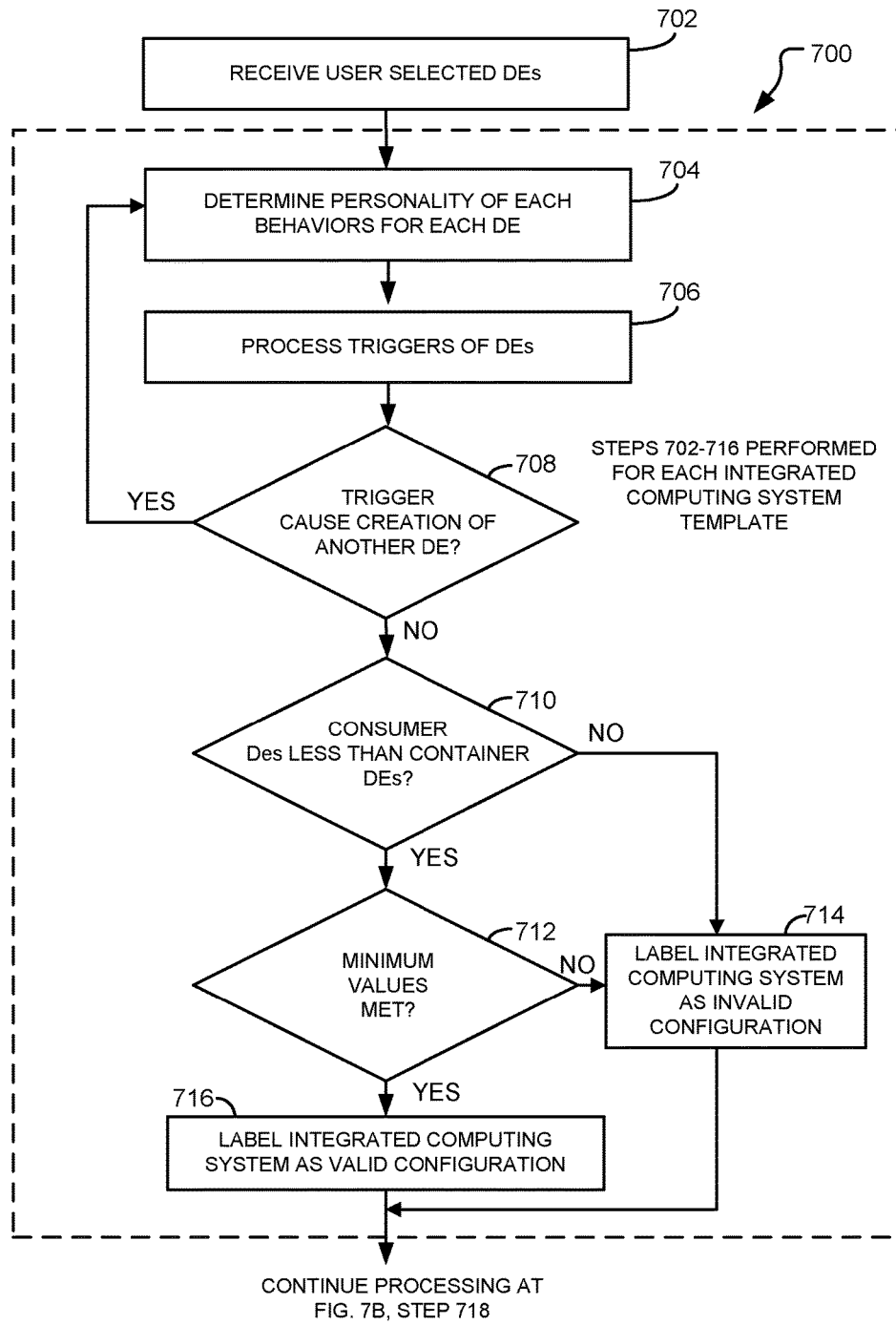
FIGS. 7A and 7B illustrate an example process that may be performed by the application to create a customized integrated computing system configuration according to one embodiment of the present disclosure.
Figure 7B:
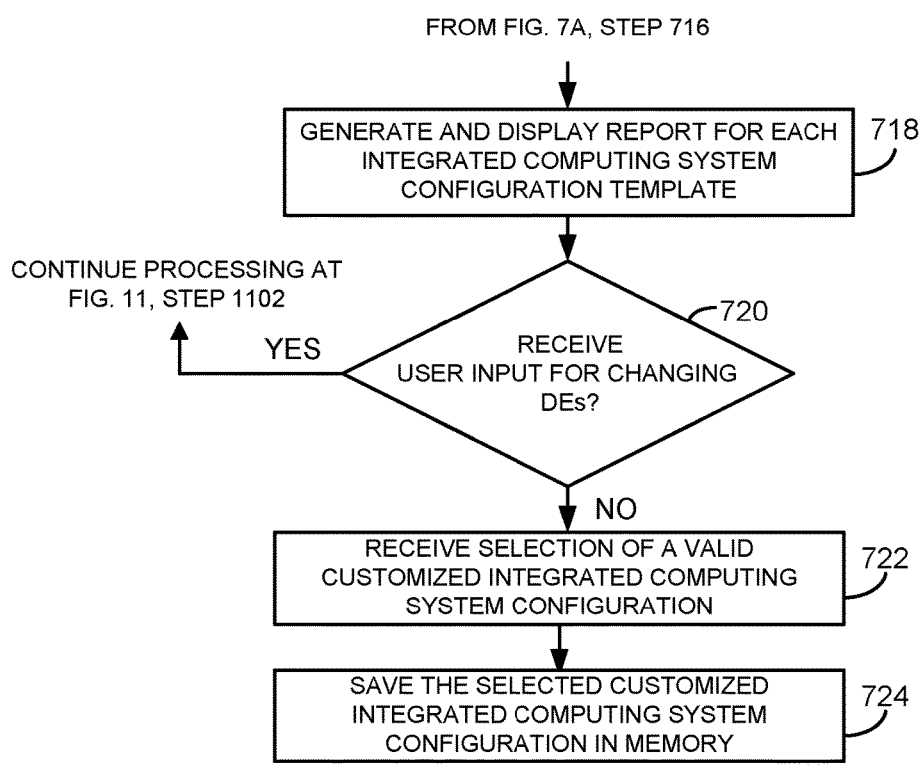

FIGS. 7A and 7B illustrate an example process 700 that may be performed by the application 104 to create a customized integrated computing system configuration 116 according to one embodiment of the present disclosure. Initially, DEs are generated for each of the components that are to be made available for inclusion in the customized integrated computing system configuration 116 as described above with reference to FIG. 5.

In step 702, the application 104 receives, via the user interface 108, selection of one or more user selected DEs 126 to be included in the customized integrated computing system configuration 116. The DEs 126 may include any type and at any desired level of hierarchy in the corpus (e.g., gamut) of available DEs 126. For example, the application 104 may receive user selection of a top level DE 126 indicating that a customized integrated computing system configuration 116 is to be generated from a particular integrated computing system configuration template 120. As another example, the application 104 may receive user selection of a specified quantity of compute blades such that the application 104 may generate the customized integrated computing system configuration 116 around those compute blades selected for inclusion by the user.

When user selection of user supplied DEs 126 have been obtained, the application 104 performs a validation process to determine which, if any, integrated computing system configuration templates 120 may use those user selected DEs to form a valid integrated computing system configuration in steps 704 through 716. In one embodiment, the application 104 performs the validation process for each of the available integrated computing system configuration templates 120 simultaneously (e.g., concurrently, in parallel). In another embodiment, this concurrent behavior may be enabled by logic, which is stored and maintained in each DE 126, such that, when the application 104 receives a request to validate the user selected DEs, the logic in each user selected DE is triggered to begin validating itself against other DEs included in the customized integrated computing system configuration 116. Additional detail to embodiments of the concurrent validation behavior of each of the DEs 126 will be described in further detail herein below with reference to FIG. 11. Nevertheless, the validation steps of 704 through 708 are performed for each integrated computing system configuration template 120 available to the system.

In step 704, the application 104 determines a personality for the behaviors included in each user selected DE as well as other DEs that have been automatically added by the application 104. Generally speaking, the application 104 may identify each of one or more behaviors (e.g., a container-based behavior, a consumer-based behavior, a minimum value-based behavior, and/or a generic trigger-based behavior) having a certain personality, and based on that personality, ensure certain other DEs 126 are present to adequately satisfy that personality. For example, when a consumer-based behavior having a specified personality (e.g., a reserved rack unit) is found, it may scan the other DEs 126 in the customized integrated computing system configuration 116 to ensure that an unused space is provided in one or more rack DEs such that the specified personality (e.g., the reserved rack unit) may be satisfied. As another example, when a consumer-based behavior has a compute blade personality, the application 104 may scan the other DEs 126 in the customized integrated computing system configuration 116 to ensure that a container DE (e.g., a compute blade chassis DE) is provided for that compute blade.

In some cases, a behavior may have been previously assigned with a specified personality. In other cases, a behavior may have one or more alternative personalities. In such cases, the application 104 determines a personality for each behavior and assigns that behavior with its determined personality. Additional details of how the application 104 determines personalities for the behaviors of each DE 126 are described in detail below with reference to FIG. 8.

In step 706, the application 104 processes the triggers of the behaviors of each DE 126. Processing of the triggers may involve validation of existing DEs 126 in the customized integrated computing system configuration 116, addition, by the application 104, of new DEs 126, modification of existing DEs, and/or removal of other DEs 126 from the customized integrated computing system configuration 116 based upon the behaviors included in certain DEs. In one embodiment, the application 104 may validate the behaviors of certain DEs 126 according to their personalities. For example, certain behaviors may possess a single potential personality; therefore, validation for that behavior may be immutable in that only one remedial action may be provided to make those behaviors valid. As such, the application 104 may identify those behaviors that are immutable and automatically modify those DEs 126 (e.g., adding, deleting, changing DEs) such that the DE 126 may be validated.

In step 708, the application 104 determines whether processing of a trigger causes the behavior of another trigger to be processed. If so, processing continues at step 704 to validate the newly create DE; otherwise, processing continues at step 710. When processing the triggers of a first DE 126, the application 104 may automatically create a second DE 126 and add that DE to the customized integrated computing system configuration 116. Additionally, this automatic DE 126 creation feature may occur to the second DE 126 such that a third DE is automatically created. For example, when the application 104 encounters a DE representing a storage rack, it may automatically instantiate one or more storage chassis to be included in the customized integrated computing system configuration 116, which needs to be processed to ensure that a valid configuration of the customized integrated computing system configuration 116 exists. Therefore, when a new DE is added to the customized integrated computing system configuration 116 in response to a trigger of a first DE, any triggers present in that new DE should also be verified. Given this iterative nature of automatic DE creation, processing of ensuing DEs may, in some cases, yield an infinite loop such that processing of the triggers of all DEs never becomes completely resolved. Thus, the application 104 may increment a counter each time a DE 126 is automatically created, and when the counter reaches a specified value indicating that a specified number of automatic DE creation iterations have occurred, terminate the application 104, and generate an error message for the user.

In step 710, the application 104 may verify that the DEs 126 having a consumer-based behavior have a sufficient number of DEs 126 with a complementary container-based behavior to support those DEs having the consumer-based behavior. For example, the DE representing a hard disk storage device may be assigned with a consumer-based behavior to indicate it consumes one slot of 48 available slots of a DE representing a storage array chassis that has been assigned with a container-based behavior. When the application 104 encounters the DE representing a hard disk storage device with a consumer-based behavior, it may count all of the DEs presenting multiple hard disk storage devices, count all of the DEs representing any storage array chassis, and ensure that there is at least one DE representing a storage array chassis for every 48 DEs representing hard disk storage devices. If not, the application 104 may determine that the customized integrated computing system configuration 116 is an invalid configuration at step 714.

In step 712, the application 104 may process any DEs 126 having a minimum value-based behavior to ensure that the customized integrated computing system configuration 116 have a sufficient quantity of DEs 126 associated with certain components. For example, when a DE representing a UCS domain component has a minimum value-based behavior with a UCS personality, that personality attribute may specify that at least 2 other DEs 126 representing fiber interconnect (FI) switches should be present in the customized integrated computing system configuration 116. Accordingly, the application 104 may then scan through the customized integrated computing system configuration 116 to ensure that at least 2 other DEs representing FI interconnect switches are present in the customized integrated computing system configuration 116; otherwise, the application 104 may determine that the customized integrated computing system configuration 116 is an invalid configuration at step 714. In another example, the application 104 may process any DEs 126 having a generic trigger-based behavior to ensure that any criteria associated with those triggers are adequately met. For example, when a DE representing a UCS expansion chassis has a generic trigger-based behavior, that behavior may specify that at least 4 DEs representing compute blades are present in the customized integrated computing system configuration 116; otherwise, the application 104 may determine that the customized integrated computing system configuration 116 is an invalid configuration at step 714.

In step 716, the application 104 labels the integrated computing system template 120 as a valid configuration. In general, the application 104 only arrives at, and processes step 716 when all validation tests performed for the behaviors for each DE 126 has been determined to provide a valid configuration.

In step 718, the application 104 generates a report for each integrated computing system configuration template 120, and displays the generated report for view by the user. In one embodiment, the application 104 may display each integrated computing system configuration template 120 and an indication of whether the current DEs specified in the customized integrated computing system configuration 116 form a valid configuration. Thereafter in step 720, the application 104 determines whether the user wants to edit the current customized integrated computing system configuration 116. If so, processing continues at 702 for adding, changing, and/or removing certain DEs in the current customized integrated computing system configuration 116; otherwise, processing continues at step 722 in which the application 104 receives user selection of one integrated computing system template 120 having a valid configuration.

In step 724, the application 104 saves the customized integrated computing system configuration 116 in the data source 106. The customized integrated computing system configuration 116 may be a completed valid customized integrated computing system configuration 116 configuration that is ready for assembly into a customized integrated computing system 118. The user customized integrated computing system configuration 116 may also be a partially completed customized integrated computing system configuration 116 that may be saved for further editing at a future point in time. For example, the user may develop a completed customized integrated computing system configuration 116 over multiple login sessions in which a partially completed customized integrated computing system configuration 116 is saved after each session. Nevertheless, when a completed customized integrated computing system configuration 116 has been created by the application 104, it may be saved and used for final assembly of a valid customized integrated computing system 118.

Figure 8:
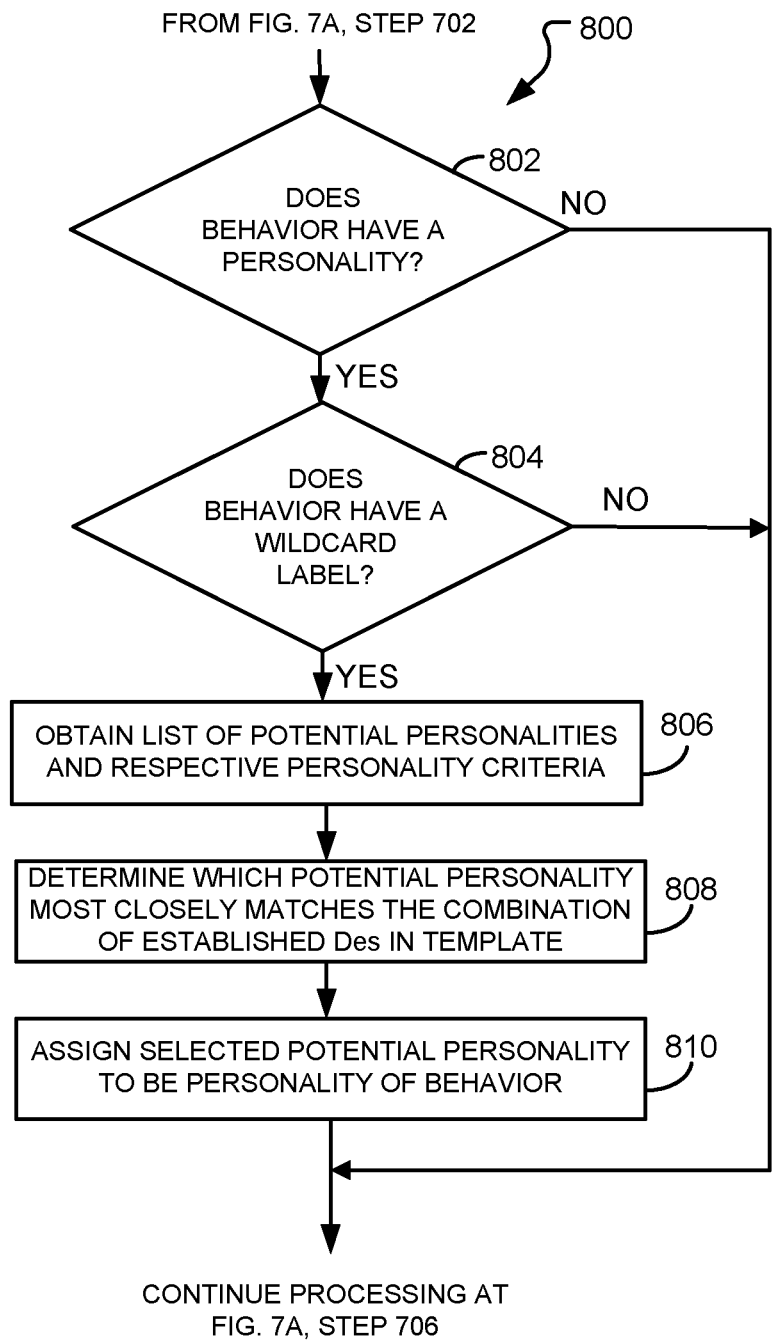
FIG. 8 illustrates an example process that may be performed by the application to determine a personality for the behaviors included in the DEs of the customized integrated computing system configuration according to one embodiment of the present disclosure.

FIG. 8 illustrates an example process 800 that may be performed by the application 104 to determine a personality for the behaviors included in the DEs 126 of the customized integrated computing system configuration 116 according to one embodiment of the present disclosure. As described previously, each DE 126 may, or may not, have one or more personalities indicating a particular behavior that its respective component 112 is to emulate. As such, the application 104 may identify each of one or more behaviors (e.g., a container-based behavior, a consumer-based behavior, a minimum value-based behavior, and/or a generic trigger behavior) having a certain personality, and based on that personality, ensure certain other DEs 126 are present to adequately satisfy that personality. The example process describes how personalities may change or adapted according to the combined gamut (e.g., corpus) of DEs in the customized integrated computing system configuration 116 so that a valid configuration may be obtained.

Initially, the application 104 may arrive at the process 800 after performing step 702 of FIG. 7A, in which the application 104 has received user selected DEs 126 from a user. Thereafter in step 802, the application 104 determines whether or not each DE 126 in the customized integrated computing system configuration 116 has a personality. Each DE may, or may not, have a personality. For example, a power output unit (POU), which is typically included as a component in each computing rack of the customized integrated computing system 118, often does not possess any characteristic particular to a personality, and thus may not have a personality. Thus, in step 802, the application 104 determines whether the DE 126 possesses a personality; otherwise, processing of the process 800 ends, and the application 104 continues the process 700 of FIG. 7A at step 706.

In step 804, the application 104 determines whether the DE 126 has a wildcard personality. A wildcard personality generally refers to one that can take on more than one personality based upon certain structured combinations of other DEs 126 in the customized integrated computing system configuration 116. Any suitable keyword may be used to denote a wildcard personality. For example, a term 'any' may be used by the system to denote a wildcard personality, however, any suitable nomenclature may be used without departing from the spirit and scope of the present disclosure. One example of a DE 126 that may have a wildcard personality includes a random access storage device (e.g., DIMMs) that may be used to provide various capacities in support of a customized integrated computing system 118. If the application 104 determines that the DE 126 has a wildcard personality, processing continues at step 806; otherwise, processing of the process 800 ends, and the application 104 continues the process 700 of FIG. 7A at step 706.

In step 806, the application 104 obtains a list of potential personalities for its respective behavior. In one embodiment, the list of potential personalities is stored in the DE 126. For example, the list of potential personalities 514 may be stored in the metadata field 502 of the DE 126. In this manner, as the component 112, its behavior, and related personalities is modified over time, the list of potential personalities 514 may be maintained in a location where those personalities are used, and independent of the application 104 such that those personalities may be managed and updated independently of how and when the application 104 is managed and updated.

In step 808, the application 104 determines, for each potential personality in the list of personalities, which criteria of each potential personality most closely matches the combination of other DEs 126 in the customized integrated computing system configuration 116. In one embodiment, the personality criteria may be stored along with its respective potential personality 514 in the DE 126. The personality criteria associates an expected combination of other DEs in the integrated computing system template 120 that would most likely be conducive for operation of the subject DE 126 at its stated personality. For example, a potential personality comprising a UCS domain may be associated with a criterion that includes a pair of FI switches to provide both local area network (LAN) interconnectibility and storage area network (SAN) interconnectibility. As such, when the application 104 encounters a potential personality having a UCS domain, it may scan the other DEs 126 in the customized integrated computing system configuration 116 to determine whether at least two other DEs 126 representing FI switches are present in the customized integrated computing system configuration 116. If so, the application 104 may determine that the UCS domain potential personality is a valid potential personality. As another example, a potential personality comprising a particular product class, such as a one or more integrated computing system configuration templates 120 that may be associated with criteria that includes specification a certain quantity of customer uplinks (e.g., communication links) to be provided for users of the customized integrated computing system 118. When the application 104 encounters such a potential personality, and the specified quantity of DEs 126 representing customer uplinks are not included in the customized integrated computing system configuration 116, the application 104 may then determine that the particular product class is not a valid potential personality of its respective behavior.

In one embodiment, the application 104 may generate scores for each potential personality whose criteria is most closely met by the structured combination of other DEs in the customized integrated computing system configuration 116, and when scores have been generated for each potential personality, assign the potential personality having the highest score to the behavior.

In step 810, the application 104 assigns the selected personality to the behavior of the DE. In one embodiment, the application 104 modifies the DE 126 record stored in the data source 106. In this manner, further processing conducted on the DE 126 may use the assigned personality to build and verify a valid configuration for the customized integrated computing system configuration 116.

Although the description of FIGS. 7 and 8 describe example processes that may be performed by the application 104 to verify an integrated computing system template 120, the features of the disclosed process may be embodied in other specific forms without deviating from the spirit and scope of the present disclosure. For example, the application 104 may perform additional, fewer, or different steps than those steps as described in the present examples. As another example, certain steps of the process described herein may be performed by other computing devices external to the system 100, such as another computing device that communicates with the computing system 102 using a communication network such as described above.

Figure 9A:
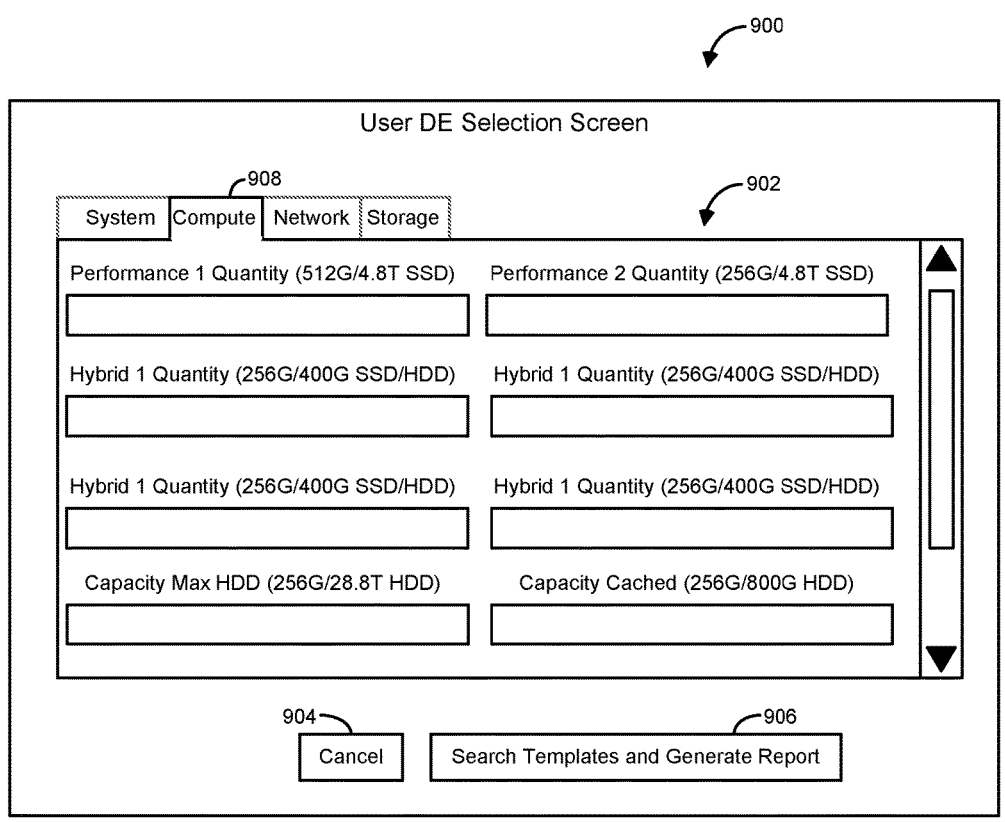
FIGS. 9A through 9D illustrate example screenshots that may be displayed by the application for interacting with the user to receive information for creating a customized integrated computing system configuration representing a customized integrated computing system according to one embodiment of the present disclosure.
Figure 9B:
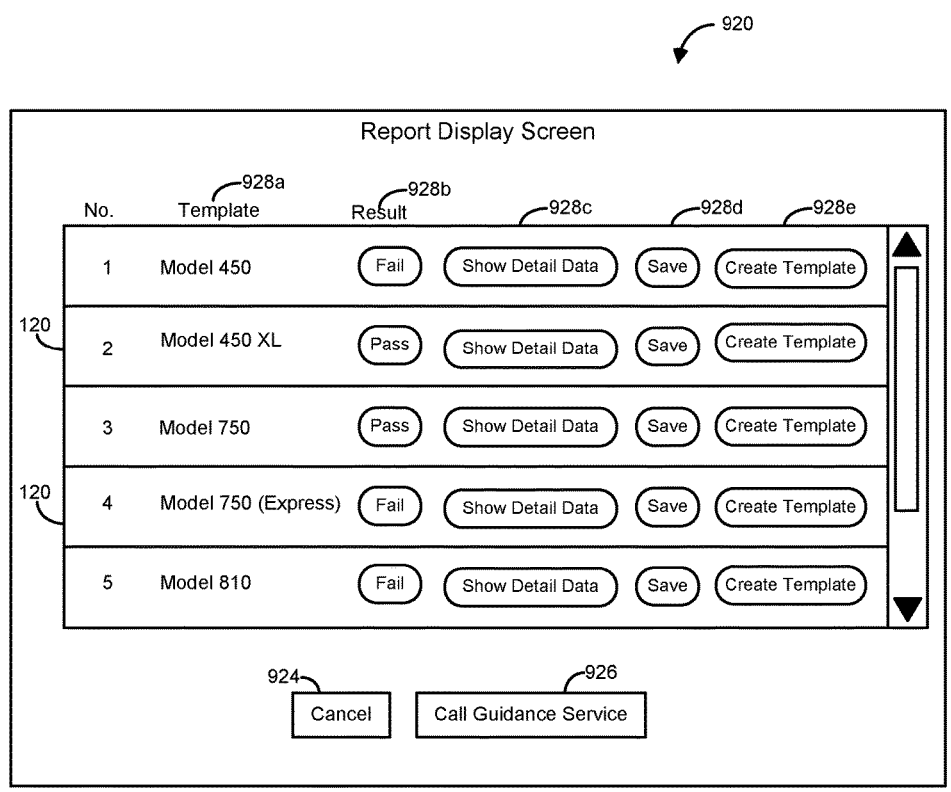
Figure 9C:
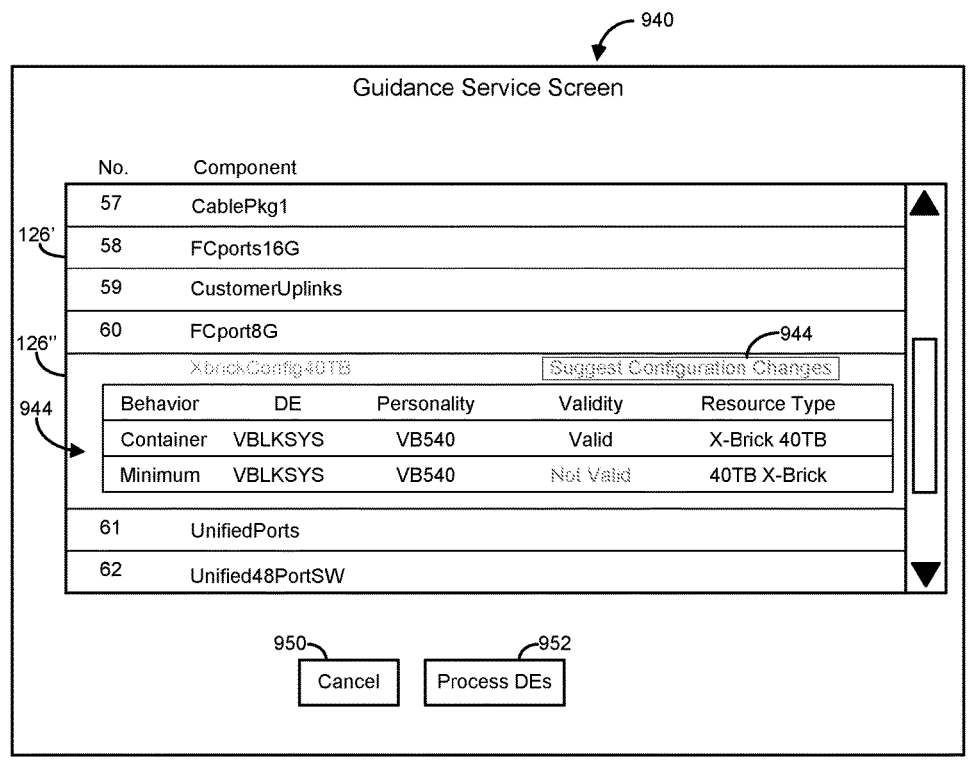
Figure 9D:
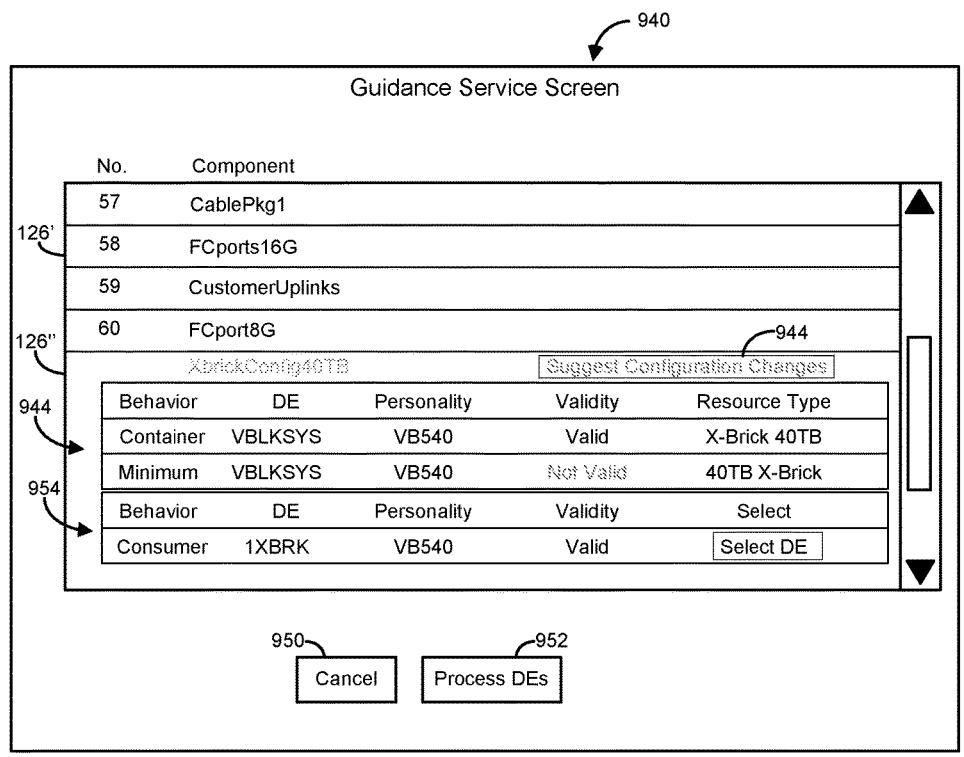

FIGS. 9A through 9D illustrate example screenshots that may be displayed by the application 104 for interacting with the user to receive information for creating a customized integrated computing system configuration 116 representing a customized integrated computing system 118 according to one embodiment of the present disclosure. In general, FIG. 9A is a user DE selection screen 900 that may be used to receive user input for selecting one or more DEs 126, FIG. 9B is a report display screen 920 that may be displayed for displaying the results associated with valid and invalid configurations of integrated computing system templates 120 based upon user selected DEs 126 entered in the DE selection screen 900, FIG. 9C is a guidance service screen 940 that may be displayed for displaying those DEs 126 in the customized integrated computing system that caused the customized integrated computing system configuration 116 to form an invalid configuration, and FIG. 9D illustrates a DE suggestion window that may be displayed to receive user input for providing one or more remedial actions to correct the invalid configuration of the customized integrated computing system configuration 116.

Referring initially to FIG. 9A, the user DE selection screen 900 includes a tabbed DE sub-system selection screen 902, a 'cancel' button 904, and a 'search templates and generate report' button 906. The tabbed DE sub-system selection screen 902 provides for user selection of DEs 126 according to the various sub-systems of an integrated computing system (e.g., generic (system wide) components, compute sub-system, network, sub-system, and storage sub-system, etc.). The tabbed DE sub-system selection screen 902 includes multiple tabs 908, that when selected by the user, display various previously configured sub-systems associated with its particular sub-system. As shown, the compute sub-system tab 908 has been selected; thus, the application displays multiple DEs that may be selected by the user for inclusion in the customized integrated computing system configuration 116.

Each sub-system DE 126 generally includes a structured combination of DEs 126 representing individual components 112 that form the sub-system DE 126. Although the present example shows a DE selection screen 902 that provides for selection of DEs 126 representing previously configured sub-systems, it should be understood that the user DE selection screen 900 may display DEs 126 representing single components 112 that may be selected by the user for inclusion in the customized integrated computing system configuration 116. For example, once the application 104 receives selection of a sub-system DE 126, it may display one or more other DE selection screens for receiving user selection of one or more DEs 126 representing individual components 112 to be included with the sub-system DE 126, user selection for removal of one or more DEs representing components 112 to be removed from the sub-system DE 126, and/or user selection for modification of an existing DE 126 in the sub-system DE 126.

To use the application 104, the user may arrive at the user DE selection screen 900 and enter one or more user selected DEs 126. The user selected DEs 126 may be selected from one, some, or all sub-system selection screens 902 available to the user. For example, the user may select one DE 126 from the compute sub-system selection screen, two DEs from the storage sub-system selection screen, and two DEs from the network sub-system selection screen. When selection of all desired user selected DEs 126 have been entered by the user, the 'search templates and generate report' button 906 may be selected by the user. Selection of the 'search templates and generate report' button 906 instructs the application 104 to commence validating each integrated computing system template 120 to determine whether the user selected DEs 126 provided by the user may provide a valid configuration. Upon completion of the validation of the integrated computing system templates 120, the application 104 may then display the report display screen 920 as shown in FIG. 9B.

Referring now to FIG. 9B, the report display screen 920 includes a table 922, a 'cancel' button 924, and a 'modify DEs' button 926. The table 922 is included to display the integrated computing system templates 120 as a list in which each integrated computing system template 120 occupies a row of the table 922, while validation information associated with each integrated computing system template 120 is arranged in columns. For example, the columns may include a 'template' column 928*a*, a 'result' column 928*b*, a 'show detail data' column 928*c*, a 'save' column 928*d*, and a 'create template' column 928*e*. The 'template' column 928*a* displays the name of the integrated computing system template 120 that has been validated. The 'result' column 928*b* indicates whether its respective integrated computing system template 120 may form a valid configuration given the DEs 126 selected by the user.

The 'show detail data' column 928*c* includes selectable buttons for each integrated computing system template 120 that when selected by the user, displays detailed information about particular conditions that were, or were not, properly met to form a valid configuration. For example, when the application 104 receives selection of the 'show detail data' button, it may display the established DEs 126 for the integrated computing system template 120 along with indications of certain DEs 126 that did, or did not, pass validation based on the user selected DEs 126 that were added to the customized integrated computing system configuration 116.

The 'save' column 928*d* includes selectable buttons for each integrated computing system template 120 that when selected by the user, instructs the application 104 to save the customized integrated computing system configuration 116 associated with the integrated computing system template 120 in the memory 302. The customized integrated computing system configuration 116 may be saved in any suitable format. In one embodiment, the customized integrated computing system configuration 116 may be saved in table form, such as in a spreadsheet format that may be accessed using any commonly available spreadsheet display tool.

The 'create template' column 928*e* includes selectable button for each integrated computing system template 120 that when selected by the user, instructs the application 104 to generate a new integrated computing system template 120 (e.g., a model) that can be used for generating another customized integrated computing system configuration 116 using that generated integrated computing system template 120.

Such a system may be useful for continual adaptation of the integrated computing system templates 120 according to ever-changing technological advancements in the components that make up a integrated computing system. For example, a certain integrated computing system template 120, which has been configured to use certain components that are based upon a previous technology that has now been obsoleted or rather superseded by a new technology, may be updated to use the newer technology by customizing that integrated computing system template 120 to use the newer technology and creating a new template 120 by selecting the 'create template' button so that ensuing customization may be performed using the newly created integrated computing system template 120 that has been customized to include the new technology.

The 'call guidance service' button 926 may be provided to modify the user selected DEs 126 entered by the user. For example, the user may access the details, using the 'show detail data' button 928*c* of a particular integrated computing system template 120 that failed validation, identify why that integrated computing system template 120 failed validation, and select the 'Call Guidance Service' button 926 to modify the user selected DEs 126 to correct the failed condition. The aforedescribed process may be iteratively conducted multiple times until a desired integrated computing system template 120 may be validated using the combination of DEs 126 selected by the user.

When actuation of the 'call guidance service' button 926 is received by the application 104, it may display the guidance service screen 940 as shown in FIG. 9C. The guidance service screen 940 displays the DEs 126 in the customized integrated computing system configuration 116 as a list with rows 942 in which each row 942 is populated with one DE 126 of the customized integrated computing system configuration 116. The DEs 126' that were properly validated may be displayed in a different manner from those DEs 126" that were non-validated DEs 126 (e.g., those DEs 126 that caused the invalid configuration) by displaying the properly validated DEs 126 in a color (e.g., blue) that is different from the color (e.g., red) from the non-validated DEs 126. Nevertheless, any suitable visual or audible mechanism may be used to delineate the validated DEs 126' from those other DEs 126" that were not validated. The guidance service screen 940 also displays a 'cancel' button 950 that when selected by the user, causes the application 104 to exist the guidance service screen 940 and a 'process DEs' button 952 that when selected, causes the application 104 process each of DEs 126 in the customized integrated computing system configuration 116 to again validate each of the DEs 126 in the customized integrated computing system configuration 116.

For those DEs 126" that were not validated, the application may display a personality display screen 944 that displays a list having rows 946 populated with one or more of the personalities of the DE 126" that was not validated. In this manner, the user may be notified of which particular behavior of the DE 126" that caused it to be not validated. Additionally, for those DEs 126" that were not validated, a 'suggest configuration changes' button 948 may be displayed for prompting user input for receiving a remedial action to be applied to the customized integrated computing system configuration 116. When the 'suggest configuration changes' button 948 is selected by the user, the application may display the guidance service screen 950 as shown in FIG. 9D.

Referring now to FIG. 9D, when the 'suggest configuration changes' button 948 is selected, the application 104 display a suggestion window 954 for receiving selection of one of multiple optional remedial actions to be taken that when applied to the customized integrated computing system configuration 116, may cause the non-validated DE 126" to become validated. In the example guidance service screen 940 as shown, 2 alternative remedial actions may be taken, a first remedial action includes an addition of a DE 126 that functions as a container to be used for supporting the operation of the DE 126", while a second remedial action involves removal of that DE 126" from the customized integrated computing system configuration 116. Although only two types of remedial actions are shown in the present example, any suitable type of remedial action may be displayed that when applied to the customized integrated computing system configuration 116, causes the DE 126" to become validated. For example, one remedial action may include an addition of one or more other DEs 126, removal of one or more existing DEs 126, or modification of one or more existing DEs in the customized integrated computing system configuration 116.

Although FIGS. 9A through 9D illustrate example screens that may be used for receiving user input for generating a customized integrated computing system configuration 116 using user selection of certain DEs 126, the application 104 may display additional, fewer, or different screens or information included in those screens without departing from the spirit and scope of the present disclosure. For example, the application 104 may display other screens for displaying details of user selected DEs 126 entered by the user, or receiving entry of other information for forming the customized integrated computing system configuration 116.

Figure 10:
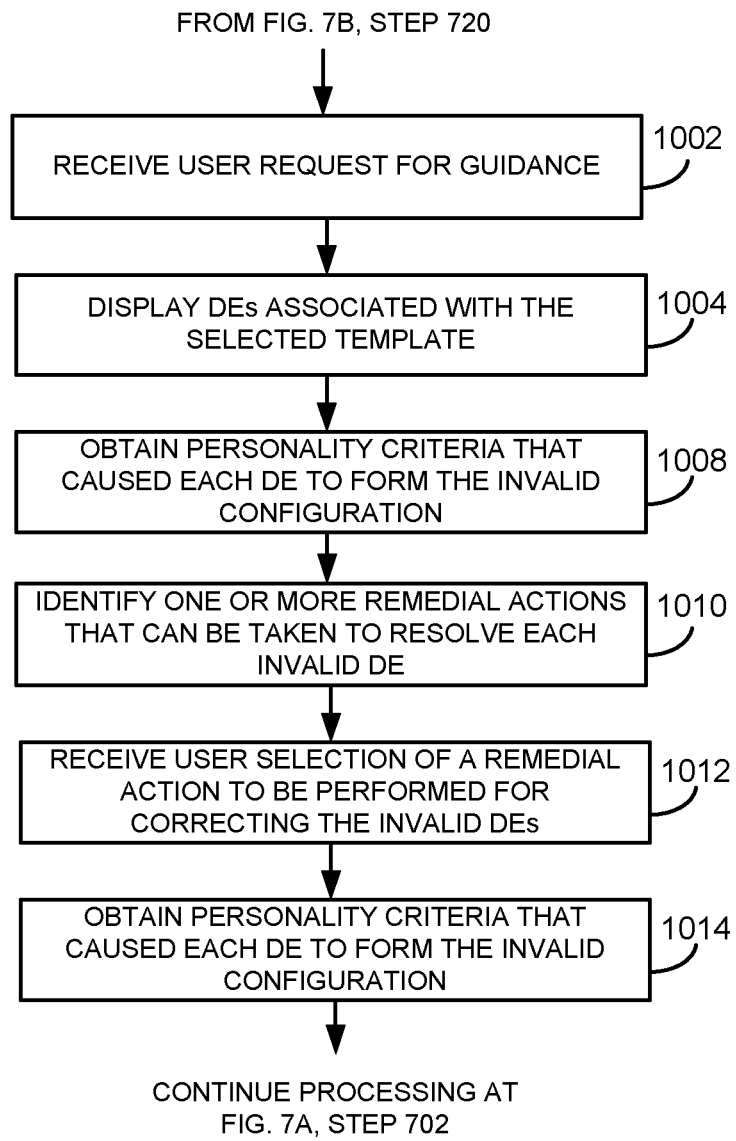
FIG. 10 illustrates an example process that may be performed by the application to provide user selected guidance for one or more non-validated DEs in a customized integrated computing system configuration according to one embodiment of the present disclosure.

FIG. 10 illustrates an example process 1000 that may be performed by the application 104 to provide user selected guidance for one or more non-validated DEs 126 in a customized integrated computing system configuration 116 according to one embodiment of the present disclosure. The process 1000 may be entered as a result of execution of step 720 as described above with respect to FIG. 7B.

In step 1002, the application 104 receives a user request for guidance for a particular integrated computing system template 120. For example, the application 104 may display the 'call guidance service' button 924 as shown in FIG. 9B in which the user may select a particular integrated computing system configuration template 120 followed by selection of the 'call guidance service' button 924.

In step 1004, the application 104 displays the DEs 126 associate with the selected template 120 for view by the user. Thereafter, the application 104 may receive a user request for guidance of modification to the customized integrated computing system configuration 116 to form a valid configuration in step 1006. In one embodiment, the request for guidance may be associated with a particular DE 126 that may have caused the invalid configuration. For example, the customized integrated computing system configuration 116 may have several DEs 126 that caused the customized integrated computing system configuration 116 to form an invalid configuration. In such cases, the application 104 may receive individual requests for each DE 126 that caused the invalid configuration so that remedial action may be applied to each invalid DE 126.

In step 1008, the application 104 obtains one or more personality criteria that caused the DE 126 to form the invalid configuration. For example, each DE 126 may include multiple personality criteria for each of multiple behaviors (e.g., container-based behaviors, consumer-based behaviors, minimum value-based behaviors, and generic trigger-based behaviors), while only one or a few of the multiple behaviors of the DE 126 caused the customized integrated computing system configuration 116 to have an invalid configuration. Thus, the application 104 may obtain each of the personality criteria for each behavior of the DE and display those personalities so that the user may be notified about which personality caused the invalid configuration. In one embodiment, the personality criteria and their resulting validation may be obtained from the process performed at step 706 of FIG. 7A.

In step 1010, the application 104 identifies one or more remedial actions that may be taken to resolve the invalid DE 126 and displays the result of those remedial actions for view by the user. For example, if a particular DE 126, such as one having a personality of a UCS configuration has been identified to cause the invalid configuration, the application 104 may process that personality to determine which criterion caused the invalid configuration, and identifies an addition of a fiber channel switch, which is a requirement for the UCS configuration, as a remedial action for the invalidated DE 126. Similar techniques may be performed for other personalities of the invalid DE 126.

In one embodiment, the application 104 may automatically validate the behaviors having a single potential personality (e.g., an immutable personality). For example, when the application 104 encounters a DE 126 having a behavior with a single potential personality, and criteria associated with that personality has been determined to cause an invalid configuration, the application 104 may automatically perform one or more remedial actions (e.g., adding, deleting, changing DEs) such that the DE 126 form a valid configuration.

In step 1012, the application 104 receives user selection of a remedial action to be taken by the application 104 for correcting the invalid DE 126.

The previously described process may be repeatedly performed for other DEs 126 in the customized integrated computing system configuration 116 having the invalid configuration so that remedial actions may be performed for each DE 126 that caused the invalid configuration. Nevertheless, when use of the process 1000 is no longer needed or desired, the process ends.

Although the example process describes one example of how the application 104 may perform remedial actions to correct an invalid customized integrated computing system configuration 116, the features of the disclosed process may be embodied in other specific forms without deviating from the spirit and scope of the present disclosure. For example, the application 104 may perform additional, fewer, or different steps than those steps as described in the present examples. As another example, certain steps of the process described herein may be performed by other computing devices external to the system 100, such as another computing device that communicates with the computing system 102 using a communication network such as described above.

Figure 11:
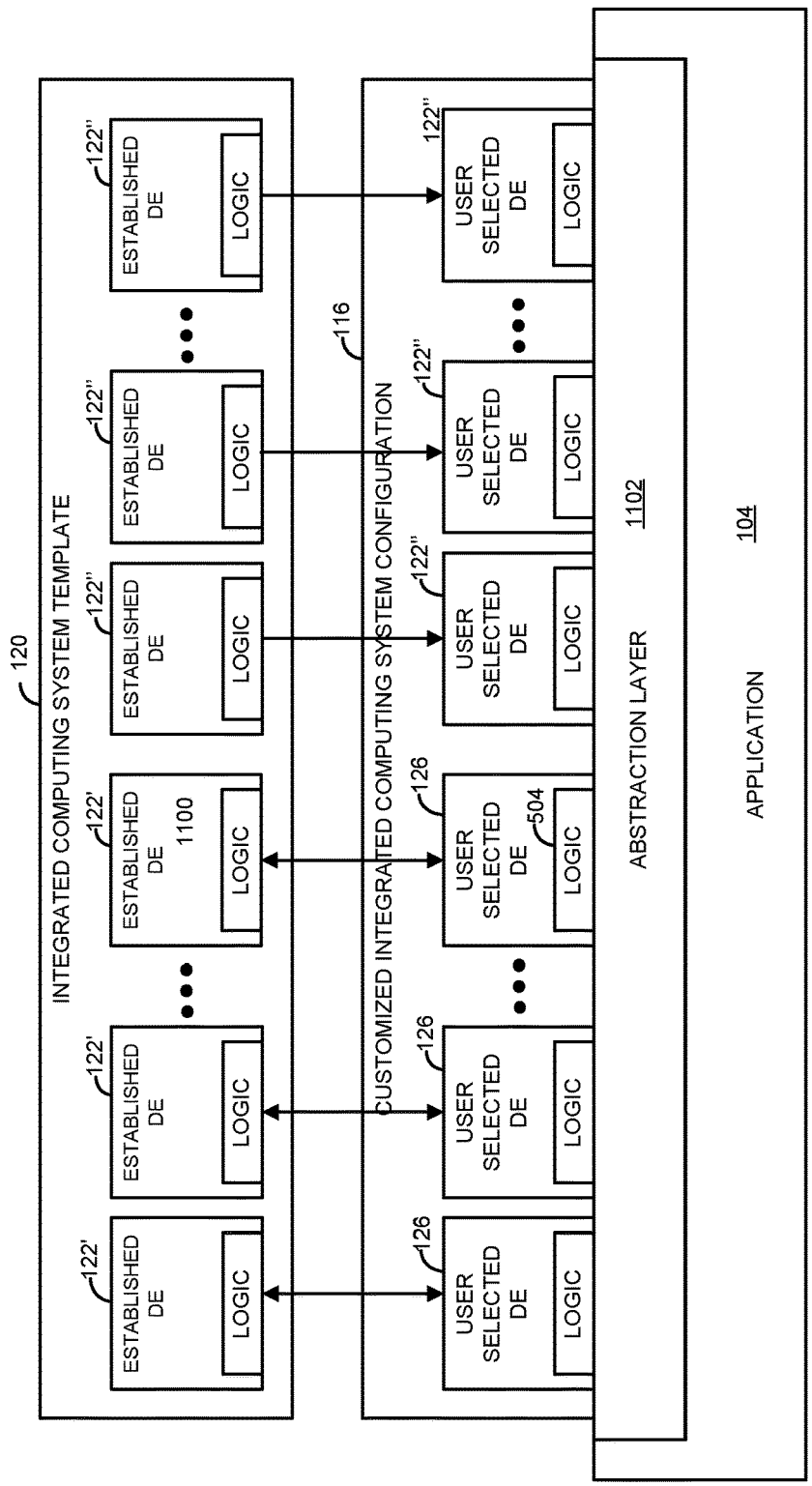
FIG. 11 illustrates an example diagram showing how the application may use the DEs to validate an integrated computing system template according to one embodiment of the present disclosure.

FIG. 11 illustrates an example diagram showing how the application 104 may use the DEs 126 to validate an integrated computing system template 120 according to one embodiment of the present disclosure. In the particular example shown, the application 104 incorporates an abstraction layer 1102 to communicate individually with each of the DEs 126 in a customized integrated computing system configuration 116. In one embodiment, the abstraction layer 1102 includes a java virtual machine (JVM) that independently manages execution of the logic 504 included in each DE 126 in which each DE 126 comprises a java applet. Using this scheme, the logic 504 in some, most, or all DEs 126 of the customized integrated computing system configuration 116 may be executed simultaneously for providing relatively quick validation reports for each of the integrated computing system templates 120. In other embodiments, the application 104 may use any suitable abstraction layer 1102 that independently manages the execution of the logic 504 of each DE 126.

To form the customized integrated computing system configuration 116 based upon the integrated computing system template 120, the application 104 may identify those established DEs 122' included in the integrated computing system template 120 that match the user selected DEs 126 included in the customized integrated computing system configuration 116, and copy those established DEs 122" that do not match to the customized integrated computing system configuration 116. Thus, the customized integrated computing system configuration 116 may have a configuration similar to the integrated computing system template 120 with the exception of the user selected DEs 126 that have been specified to be included in the customized integrated computing system configuration 116 by the user.

The logic 504 is provided to perform validation tests for its respective DE 126 based upon information included in its behavior fields (e.g., container-based behavior field 502b, consumer-based behavior field 502c, minimum value-based behavior field 502d, and generic trigger-based behavior field 502e), and upon the established DEs 122" included in each integrated computing system template 120. For example, when the logic 504 is processing the behavior fields 502 of its respective DE 126, and it encounters a behavior of a UCS configuration, it may send a signal to the abstraction layer 1102 to scan through the other DEs 126 in the customized integrated computing system configuration 116 and the established DEs 122 in the integrated computing system template 120 to ensure that those representing components necessary for a valid UCS configuration to exist.

In one embodiment, the logic 504 is state-less in that its processing does not depend upon any state information stored in its respective DE 126 or any other DE 126 in the customized integrated computing system configuration 116. That is, when some, most, or all of the DEs 126 are simultaneously executed by the abstraction layer 1102, the processing of the logic 504 in either DE 126 does not create states that may require iterative processing among the logic 504 of each DE 126. For example, when the logic 504 of a particular DE 126 sends an instruction to the abstraction layer 1102 to check for certain personality characteristics of another DE 126 and that other DE has not yet denied its wildcard personalities yet, the logic 504 may wait for that DE 126 to identify its wildcard personalities prior to checking the personality characteristics of that other DE 126.

Embodiments of the present disclosure may provide a system that allows some, most, or all core functionality associated with operation of the system to be maintained in the DEs 126, while minimal functionality is maintained in the application 104 such that recurring software upgrades affecting the core functionality may be performed independently of the application 104. Given this architecture therefore, the application 104 may be freely distributed to differing parties, such as customers of an organization, vendors of the organization, partners of the organization, and the like, without substantial regard to what version of software that may be currently in use. Because the DEs 126 have a life cycle structure as described above, their core functionality may be inherently controlled in a relatively consistent manner, thus alleviating the need to maintain complex software version control systems for the application that uses the DEs 126.

Although the architecture has been described with regard to validating the components of a customized integrated computing system 118, it is contemplated that the architecture may be embodied in other specific forms without deviating from the spirit and scope of the present disclosure. That is, any suitable type of test system may be analyzed to validate the inter-relationship of its constituent objects by modeling its objects as DEs and aggregating the DEs as an aggregated object configuration to validate their inter-relationship among one another. For example, the architecture may be used to analyze the dynamic relationships among the personnel of an organization (e.g., test system), such as businesses, by modeling each person as a DE 126 in which each DE 126 includes behaviors and logic that determines how those behaviors are applied to other personnel in the organization. As another example, the architecture may be used for providing sensitivity analysis of a test system (e.g., electrical circuit) having multiple components (e.g., resistor, capacitors, inductors, transistors, etc.) in which the sensitivity of each component may adversely affect the operation of other components in the system. In such cases, each component may be modeled as a DE in which its behaviors may possess personalities (e.g., bypass capacitor, filter capacitor, state storage, feedback compensation, etc.) having criteria that may affect other components in the system. Other examples of a system formed of interrelated components may be implemented according to the teachings of the present disclosure.

Additionally, embodiments of the architecture described above may be used for providing behavior models across a vendor-customer supply chain structure. For example, a component manufacturer 114 of a component 112 (e.g., a hard disk drive) may supply a DE 126 associated with that component 112 to its customer that integrates and sells sub-systems (e.g., storage arrays) that may use that component 112. In turn, the customer of the component manufacturer 114 may use that DE 126 to develop its sub-systems, which are subsequently provided to integrated computing system suppliers along with a DE 126 representing that sub-system. The process may be continued along the vendor-customer supply chain of that hard disk drive such that the DE 126 of that hard disk drive may be accurately and consistently modeled according to its behavior in relation to the hierarchal structure that the component is implemented.

Although FIG. 11 illustrates an example diagram of the application 104 that may be used for validating an integrated computing system template 120 using user selected DEs 126, the application 104 may display additional, fewer, or different components without departing from the spirit and scope of the present disclosure. For example, the application 104 may include other means of communicating with the logic 504 in each DE 126 for performing the validation tests, such as one where the DEs 126 are configured as plug-ins that may communicate with the application 104 via an application program interface (API) layer of the application 104.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 12:
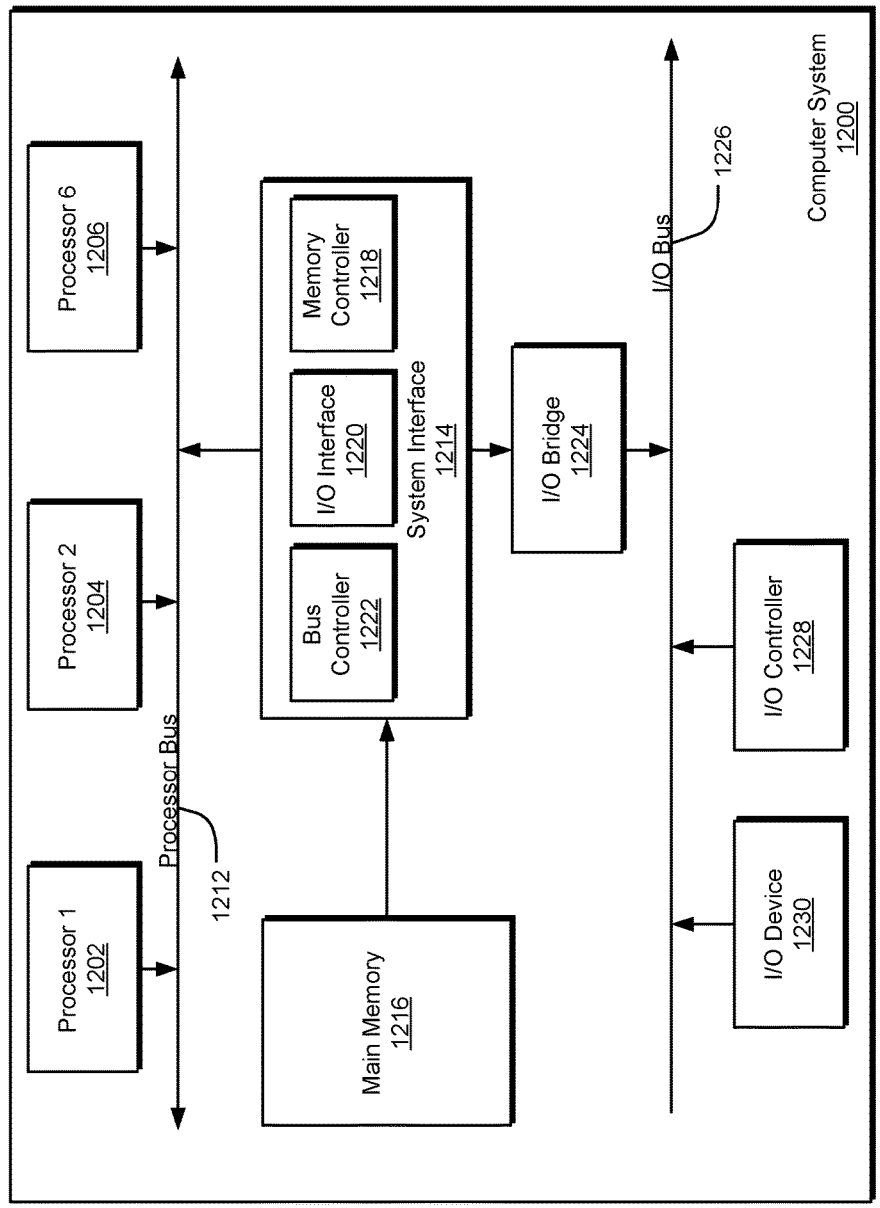
FIG. 12 is a block diagram illustrating an example of a computing device or computer system which may be used in implementing the embodiments of the present disclosure.

For example, FIG. 12 is a block diagram illustrating an example of a host or computer system 1200 which may be used in implementing the embodiments of the present disclosure. The computer system (system) includes one or more processors 1202-1206. Processors 1202-1206 may include one or more internal levels of cache (not shown) and a bus controller or bus interface unit to direct interaction with the processor bus 1212. Processor bus 1212, also known as the host bus or the front side bus, may be used to couple the processors 1202-1206 with the system interface 1214. System interface 1214 may be connected to the processor bus 1212 to interface other components of the system 1200 with the processor bus 1212. For example, system interface 1214 may include a memory controller 1218 for interfacing a main memory 1216 with the processor bus 1212. The main memory 1216 typically includes one or more memory cards and a control circuit (not shown). System interface 1214 may also include an input/output (I/O) interface 1220 to interface one or more I/O bridges or I/O devices with the processor bus 1212. One or more I/O controllers and/or I/O devices may be connected with the I/O bus 1226, such as I/O controller 1228 and I/O devices 1230, as illustrated.

I/O device 1230 may also include an input device (not shown), such as an alphanumeric input device, including alphanumeric and other keys for communicating information and/or command selections to the processors 1202-1206. Another type of user input device includes cursor control, such as a mouse, a trackball, or cursor direction keys for communicating direction information and command selections to the processors 1202-1206 and for controlling cursor movement on the display device.

System 1200 may include a dynamic storage device, referred to as main memory 1216, or a random access memory (RAM) or other computer-readable devices coupled to the processor bus 1212 for storing information and instructions to be executed by the processors 1202-1206. Main memory 1216 also may be used for storing temporary variables or other intermediate information during execution of instructions by the processors 1202-1206. System 1200 may include a read only memory (ROM) and/or other static storage device coupled to the processor bus 1212 for storing static information and instructions for the processors 1202-1206. The system set forth in FIG. 12 is but one possible example of a computer system that may employ or be configured in accordance with aspects of the present disclosure.

According to one embodiment, the above techniques may be performed by computer system 1200 in response to processor 1204 executing one or more sequences of one or more instructions contained in main memory 1216. These instructions may be read into main memory 1216 from another machine-readable medium, such as a storage device. Execution of the sequences of instructions contained in main memory 1216 may cause processors 1202-1206 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1216. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An integrated computing system comprising:
   at least one processor;
   at least one memory to store instructions that are executed by the at least one processor; and
   a plurality of components associated with a plurality of selected design elements, the plurality of selected design elements selected by a customized integrated computing configuration service based on:
   a first design element that represents one or more behaviors of a component of the plurality of components used in the customized integrated computing system; and
   a second design element determined by the customized integrated computing configuration service to meet a specified criteria associated with a personality of the first design element, the personality representing a type of behavior that the first design element and the second design element provide to the integrated computing system;
   wherein a component represented by the second design element is incorporated into the integrated computing system based on a determination by the customized integrated computing configuration service that the first design element and the second design element comprises a valid integrated computing system configuration when the second design element meets the specified criteria.

2. The system of claim 1, wherein the first design element and the second design element comprises a structured combination of parameters that are stored in the at least one memory as an integral structure, and wherein at least one of the first design element or the second design element comprises executable logic that is executed to perform the determination that the integrated computing system configuration comprises the valid integrated computing system configuration.

3. The system of claim 1, wherein the first design element comprises a wildcard personality with a plurality of potential personalities, and the customized integrated computing configuration service determines that one of the potential personalities comprises the personality according to the specified criteria.

4. The system of claim 1, wherein input is received by the customized integrated computing configuration service for modifying at least one of the first design element and the second design element, and determining whether the integrated computing system configuration including the modified at least one of the first design element and the second design element provides the valid integrated computing system.

5. The system of claim 1, wherein the one or more behaviors comprise a minimum behavior that specifies a minimum quantity of other design elements to provide the valid integrated computing system configuration.

6. The system of claim 1, wherein the one or more behaviors comprise a container behavior that specifies whether the component associated with the first design element is to is to provide a portion of its allocated capacity for at least one other component associated with at least one other design element.

7. The system of claim 1, wherein the one or more behaviors comprise a consumer behavior that specifies whether the component associated with the first design element is to consume at least a portion of an allocated capacity of at least one other component associated with at least one other design element.

8. The system of claim 7, wherein the one or more behaviors comprise a trigger behavior that specifies one or more actions that the first design element is to perform on at least one other design element.

9. An integrated computing system assembled from a method comprising:
   associating a plurality of components with a plurality of selected design elements, the plurality of selected design elements selected by a customized integrated computing configuration service;
   receiving a first design element that represents one or more behaviors of a component used in the customized integrated computing system; and
   determining, by the customized integrated computing configuration service, a second design element that meets a specified criteria associated with a personality of the first design element, the personality representing a type of behavior that the first design element and the second design element provide to the integrated computing system;
   wherein a component represented by the second design element is incorporated into the integrated computing system based on a determination by the customized integrated computing configuration service that the first design element and the second design element comprises a valid integrated computing system configuration when the second design element meets the specified criteria.

10. The method of claim 9, further comprising storing a structured combination of parameters associated with the first design element and the second design element in at least one memory as an integral structure, wherein the first design element and the second design element comprises executable logic that performs the determination that the integrated computing system configuration comprises the valid integrated computing system configuration.

11. The method of claim 9, further comprising, the first design element comprising a wildcard personality with a plurality of potential personalities, determining that one of the potential personalities comprises the personality according to the specified criteria.

12. The method of claim 9, further comprising receiving input for modifying at least one of the first design element and the second design element, and determining whether the customized integrated computing system configuration including the modified at least one of the first design element and the second design element provides the valid integrated computing system.

13. The method of claim 9, wherein the one or more behaviors comprise a minimum behavior that specifies a minimum quantity of other design elements to provide the valid integrated computing system configuration.

14. The method of claim 9, wherein the one or more behaviors comprise a container behavior that specifies whether the component associated with the first design element is to is to provide a portion of its allocated capacity for at least one other component associated with at least one other design element.

15. The method of claim 9, wherein the one or more behaviors comprise a consumer behavior that specifies whether the component associated with the first design element is to consume at least a portion of an allocated capacity of at least one other component associated with at least one other design element.

16. The method of claim 14, wherein the one or more behaviors comprise trigger behavior that specifies one or more actions that the first design element is to perform on at least one other design element.

17. A non-transitory, computer readable medium comprising instructions stored thereon to assemble an integrated computing system from a method that, when executed by at least one processor, is operable to perform at least the following:
  associate a plurality of components with a plurality of selected design elements, the plurality of selected design elements selected by a customized integrated computing configuration service;
  receiving a first design element that represents one or more behaviors of a component used in the customized integrated computing system; and
  determining, by the customized integrated computing configuration service, a second design element that meets a specified criteria associated with a personality of the first design element, the personality representing a type of behavior that the first design element and the second design element provide to the integrated computing system;
  wherein a component represented by the second design element is incorporated into the integrated computing system based on a determination by the customized integrated computing configuration service that the first design element and the second design element comprises a valid integrated computing system configuration when the second design element meets the specified criteria.

18. The non-transitory, computer readable medium of claim 17, wherein the one or more behaviors comprise a minimum behavior that specifies a minimum quantity of other design elements to provide the valid integrated computing system configuration.

19. The non-transitory, computer readable medium of claim 17, wherein the one or more behaviors comprise a container behavior that specifies whether the component associated with the first design element is to is to provide a portion of its allocated capacity for at least one other component associated with at least one other design element.

20. The non-transitory, computer readable medium of claim 17, wherein the one or more behaviors comprise a consumer behavior that specifies whether the component associated with the first design element is to consume at least a portion of an allocated capacity of at least one other component associated with at least one other design element.

* * * * *